United States Patent
Matsushita

(10) Patent No.: US 10,645,284 B2
(45) Date of Patent: May 5, 2020

(54) IMAGE PROCESSING DEVICE, IMAGE PROCESSING METHOD, AND RECORDING MEDIUM STORING PROGRAM

(71) Applicant: Kazufumi Matsushita, Kanagawa (JP)

(72) Inventor: Kazufumi Matsushita, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/967,947

(22) Filed: May 1, 2018

(65) Prior Publication Data

US 2018/0343388 A1   Nov. 29, 2018

(30) Foreign Application Priority Data

May 26, 2017   (JP) .................................. 2017-104825

(51) Int. Cl.
   *H04N 5/232*   (2006.01)
   *H04N 13/282*   (2018.01)
   *H04N 5/225*   (2006.01)

(52) U.S. Cl.
   CPC ....... *H04N 5/23238* (2013.01); *H04N 5/2251* (2013.01); *H04N 5/23254* (2013.01); *H04N 5/23267* (2013.01); *H04N 13/282* (2018.05)

(58) Field of Classification Search
   CPC .......................... H04N 5/23238; H04N 13/282
   See application file for complete search history.

(56) References Cited

U.S. PATENT DOCUMENTS

| | | | | | |
|---|---|---|---|---|---|
| 2004/0119836 | A1* | 6/2004 | Kitaguchi | ............ | H04N 5/2253 348/207.99 |
| 2010/0002071 | A1* | 1/2010 | Ahiska | ................... | H04N 5/217 348/36 |
| 2010/0208032 | A1* | 8/2010 | Kweon | .................. | G03B 37/00 348/36 |
| 2012/0281922 | A1* | 11/2012 | Yamada | ............. | H04N 5/23254 382/201 |
| 2013/0258047 | A1* | 10/2013 | Morimoto | .......... | H04N 5/23267 348/36 |

(Continued)

FOREIGN PATENT DOCUMENTS

| EP | 0831644 A2 * | 3/1998 | ......... H04N 5/23258 |
|---|---|---|---|
| JP | 1-109970 | 4/1989 | |

(Continued)

OTHER PUBLICATIONS

U.S. Appl. No. 15/908,946, filed Mar. 1, 2018, Kazufumi Matsushita.

*Primary Examiner* — Mainul Hasan
(74) *Attorney, Agent, or Firm* — Oblon, McClelland, Maier & Neustadt, L.L.P.

(57) ABSTRACT

An image processing apparatus, an image processing method, and a recording medium storing a program for causing a computer to execute the image processing method. The image processing apparatus and the image processing method includes obtaining a captured image captured using a wide-angle lens, detecting movement of an image processing apparatus, converting the captured image into a wide-angle image that at least partially involves a curved plane, calculating an amount of correction according to the movement detected by the detecting, and correcting the captured image by the amount of correction.

12 Claims, 23 Drawing Sheets

(56) References Cited

U.S. PATENT DOCUMENTS

| | | | |
|---|---|---|---|
| 2015/0062363 A1* | 3/2015 | Takenaka | H04N 5/23238 |
| | | | 348/218.1 |
| 2016/0014429 A1 | 1/2016 | Takazawa et al. | |
| 2016/0050369 A1* | 2/2016 | Takenaka | H04N 1/387 |
| | | | 348/222.1 |
| 2016/0269632 A1 | 9/2016 | Morioka | |
| 2016/0300323 A1* | 10/2016 | Nakagawa | G06T 3/0062 |
| 2017/0330337 A1* | 11/2017 | Mizutani | G06T 7/337 |

FOREIGN PATENT DOCUMENTS

| | | |
|---|---|---|
| JP | 2012-005112 | 1/2012 |
| JP | 2014-016451 | 1/2014 |
| JP | 2016-167739 | 9/2016 |
| JP | 2017-011657 | 1/2017 |

\* cited by examiner

| POST-CONVERSION COORDINATE VALUE | | PRE-CONVERSION COORDINATE VALUE | |
|---|---|---|---|
| θ (pix) | φ (pix) | x (pix) | y (pix) |
| 0 | 0 | | |
| 1 | 0 | | |
| ⋮ | ⋮ | ⋮ | ⋮ |
| 3598 | 1799 | | |
| 3599 | 1799 | | |

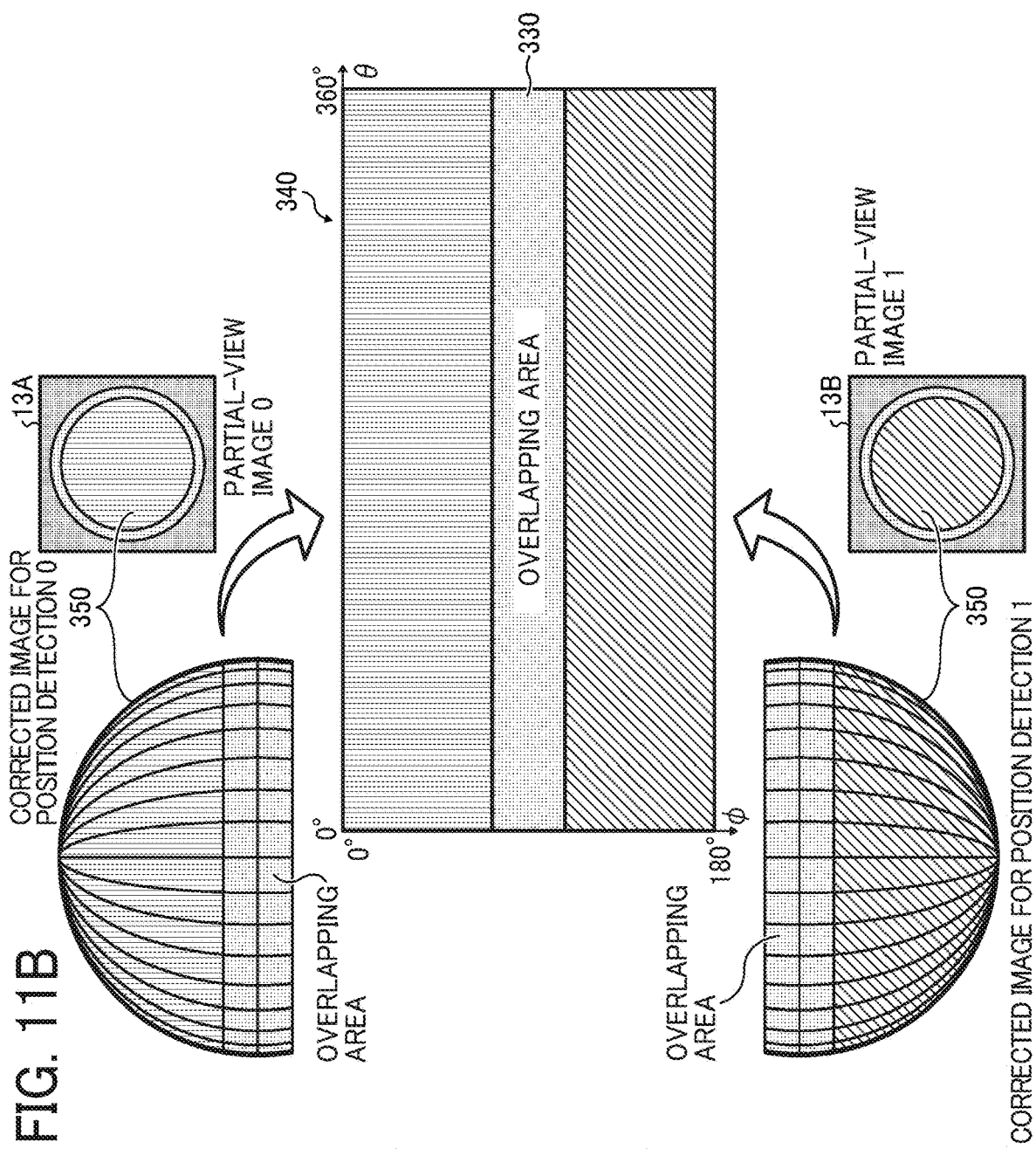
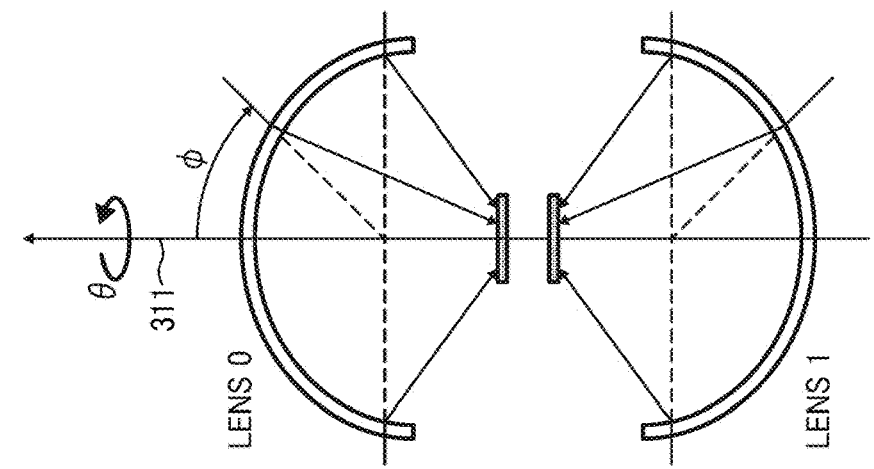
FIG. 11B
FIG. 11A

| COORDINATE VALUES OF CONVERTED IMAGE || COORDINATE VALUES OF PRE-CONVERTED IMAGE ||
|---|---|---|---|
| $\theta$ | $\phi$ | x | y |
| ⋮ | ⋮ | ⋮ | ⋮ |
| $\theta_P$ | $\phi_P$ | $x_P$ | $y_P$ |
| ⋮ | ⋮ | ⋮ | ⋮ |
| $\theta_{P'}$ | $\phi_{P'}$ | $x_{P'}$ | $y_{P'}$ |
| ⋮ | ⋮ | ⋮ | ⋮ |

P → (row with $\theta_P$)
P' → (row with $\theta_{P'}$)

| COORDINATE VALUES OF CONVERTED IMAGE | | WEIGHTING FOR AMOUNT OF CORRECTION |
|---|---|---|
| $\theta$ (pix) | $\phi$ (pix) | |
| 0 | 0 | 0 |
| 1 | 0 | 0 |
| ⋮ | ⋮ | |
| $\theta$ max−1 | $\phi$ max−1 | 0.9 |
| $\theta$ max | $\phi$ max−1 | 0.9 |
| ⋮ | ⋮ | |
| $\theta$ max−1 | $\phi$ max | 1 |
| $\theta$ max | $\phi$ max | 1 |

IMAGE PROCESSING DEVICE, IMAGE PROCESSING METHOD, AND RECORDING MEDIUM STORING PROGRAM

CROSS-REFERENCE TO RELATED APPLICATION

This patent application is based on and claims priority pursuant to 35 U.S.C. § 119(a) to Japanese Patent Application No. 2017-104825, filed on May 26, 2017, in the Japan Patent Office, the entire disclosure of which is hereby incorporated by reference herein.

BACKGROUND

Technical Field

Embodiments of the present disclosure relate to an image processing apparatus, an image processing method, and a recording medium storing a program for causing a computer to execute the image processing method.

Background Art

An omnidirectional imaging apparatus that uses a plurality of wide-angle lenses such as fish-eye lenses and super-wide-angle lenses to capture an omnidirectional 360-degree image at one-time capturing operation is known (hereinafter, such an omnidirectional image may be referred to as a spherical image). Such an omnidirectional image sensing device forms an image of the light that has passed through multiple lenses onto an imaging element, and combines the obtained images together by image processing. Accordingly, a spherical image is generated. For example, two wide-angle lenses that have angles of view of 180 degrees or wider may be used to generate a spherical image.

An omnidirectional image sensing device is an example configuration of a digital camera, and there are some cases in which the image quality of an image captured by such an omnidirectional image sensing device deteriorates as affected by camera shake. In order to control such deterioration of the image quality caused by camera shake, digital cameras may be provided with optical camera-shake correction mechanisms. Alternatively, in order to control such deterioration of the image quality caused by camera shake, digital cameras may be provided with electronic camera-shake correction mechanisms.

SUMMARY

Embodiments of the present disclosure described herein provide an image processing apparatus, an image processing method, and a recording medium storing a program for causing a computer to execute the image processing method. The image processing apparatus and the image processing method includes obtaining a captured image captured using a wide-angle lens, detecting movement of an image processing apparatus, converting the captured image into a wide-angle image that at least partially involves a curved plane, calculating an amount of correction according to the movement detected by the detecting, and correcting the captured image by the amount of correction.

BRIEF DESCRIPTION OF THE DRAWINGS

A more complete appreciation of exemplary embodiments and the many attendant advantages thereof will be readily obtained as the same becomes better understood by reference to the following detailed description when considered in connection with the accompanying drawings.

FIG. 11A and FIG. 11B are diagrams illustrating how the two partial-view images that are captured by two fish-eye lenses are mapped on a spherical coordinate system, according to an embodiment of the present disclosure.

Figure 1A:
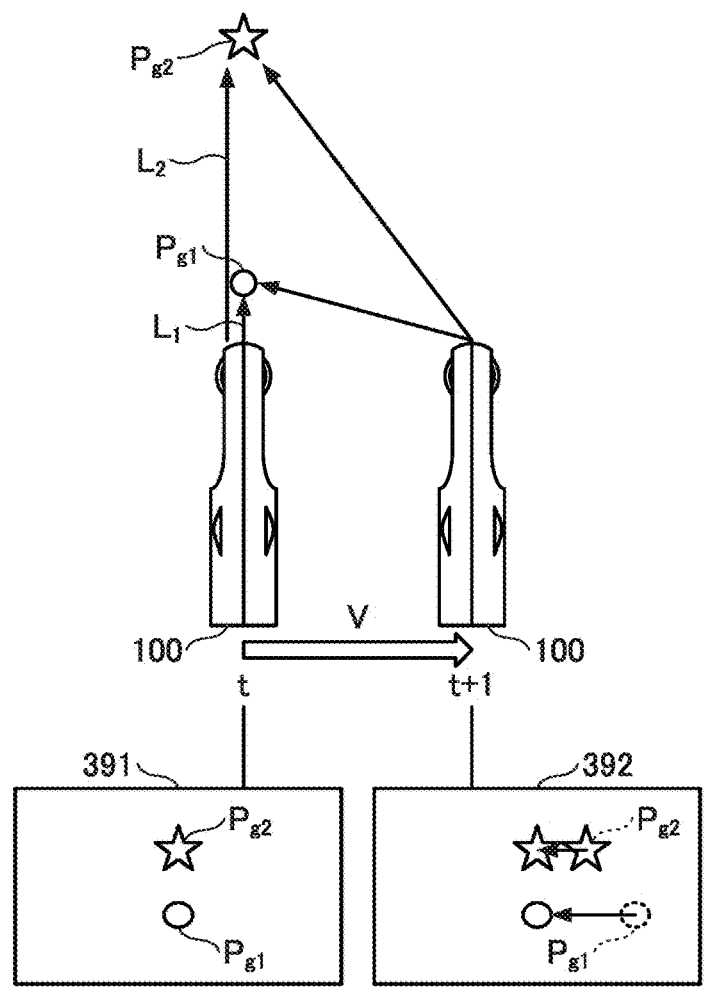
FIG. 1A and FIG. 1B are schematic diagrams each illustrating the camera-shake correction performed by an omnidirectional image sensing device, according to an embodiment of the present disclosure.

The accompanying drawings are intended to depict exemplary embodiments of the present disclosure and should not be interpreted to limit the scope thereof the accompanying drawings are not to be considered as drawn to scale unless explicitly noted.

DETAILED DESCRIPTION

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that have the same structure, operate in a similar manner, and achieve a similar result.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware at existing network elements or control nodes. Such existing hardware may include one or more central processing units (CPUs), digital signal processors (DSPs), application-specific-integrated-circuits (ASICs), field programmable gate arrays (FPGAs), computers or the like. These terms in general may be collectively referred to as processors.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Embodiments of the present disclosure are described with reference to the accompanying drawings. In particular, an image processing apparatus and a method of processing an image using the image processing apparatus are described below.

Figure 1B:
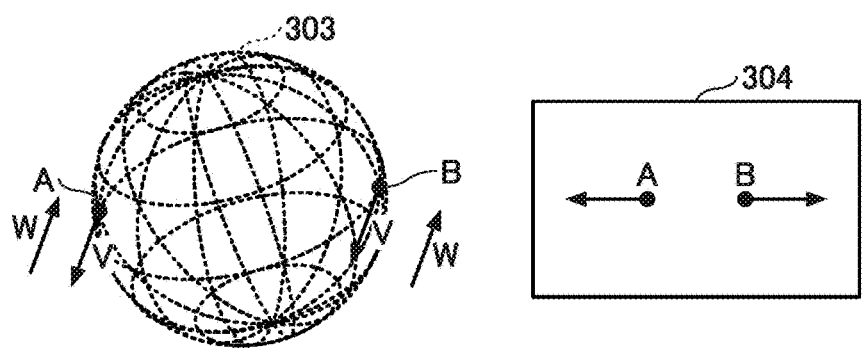

FIG. 1A and FIG. 1B are schematic diagrams each illustrating the camera-shake correction performed by an omnidirectional image sensing device 100, according to an embodiment of the present disclosure.

FIG. 1A illustrates the camera-shake correction on a planar image, for the purpose of explaining the basic concepts of camera-shake correction, according to the present embodiment.

The omnidirectional image sensing device 100 captures some objects existing in a peripheral area at time t and at time t+1, respectively, and the omnidirectional image sensing device 100 has moved by the amount of movement indicated by vector v. For purposes of simplification, it is assumed that the vector v moves in a parallel manner. Note that $L_1$ and $L_2$ denote the distance between the omnidirectional image sensing device 100 and a point $P_{g1}$ at time t and the distance between the omnidirectional image sensing device 100 and a point $P_{g2}$ at the time t, respectively.

As illustrated in FIG. 1A, the point $P_{g1}$ on an image 391 that is captured at the time t moves in a parallel manner on an image 392 that is captured at time t+1 by the amount corresponding to the distance $L_1$, and the point $P_{g2}$ on an image 391 that is captured at the time t moves in a parallel manner on the image 392 by the amount corresponding to the distance $L_2$. As a matter of course, the amount of movement of the point $P_{g1}$ is greater than the amount of movement of the point $P_{g2}$. In order to correct the displacement of the point $P_{g1}$ and the point $P_{g2}$ due to camera shake, as illustrated on the image 392, the point $P_{g1}$ and the point $P_{g2}$ may be moved in a parallel manner in the opposite direction to the vector v according to the distance $L_1$ and the distance $L_2$. The same can be said of cases in which the omnidirectional image sensing device 100 is rotated due to camera shake. It is considered that the point $P_{g1}$ and the point $P_{g2}$ may be rotated in the direction of the rotation indicated by the vector v, according to the distance $L_1$ and the distance $L_2$, in order to correct the displacement of the point $P_{g1}$ and the point $P_{g2}$ due to camera shake.

FIG. 1B is a diagram illustrating camera-shake correction to be performed on an omnidirectional image (spherical image) captured by a wide-angle lens, according to the present embodiment.

The omnidirectional image (spherical image) that is captured by the omnidirectional image sensing device 100 is illustrated as a three-dimensional sphere 303. For this reason, it is difficult to perform correction in a similar manner to the correction that is performed on the image 392. More specifically, when the omnidirectional image sensing device 100 moves due to camera shake, the sphere is to move as well. However, even when the sphere 303 moves in a parallel manner as indicated by the vector v, objects existing in the 360-degree omnidirectional area are captured on a planar image 304 where the omnidirectional image (spherical image) is developed. Due to this configuration, points on the planar image 304 do not move in a parallel manner. For example, both a point A and a point B on the sphere 303 that are away from each other by 180 degrees in the longitude direction move as indicated by the vector v. However, the planar image 304 is the image that is obtained by developing the sphere 303 on a plane. For this reason, the point A and the point B on the planar image 304 move in the opposite directions (in actuality, the moving directions vary depending on how the point A and the point B are taken). Accordingly, it is difficult for the omnidirectional image sensing device 100 to perform camera-shake correction on the planar image 304.

In view of the above circumstances, the omnidirectional image sensing device 100 according to the present embodiment corrects the camera shake upon representing the omnidirectional image (spherical image) on the spherical coordinates. The spherical coordinates are two-dimensional in a strict sense. However, the spherical coordinates are curved. Accordingly, camera-shake correction is performed on the three-dimensional sphere 303. The omnidirectional image sensing device 100 estimates a vector w that indicates how the image on the sphere 303 changes due to the movement (movement in a parallel manner and rotation) of the omnidirectional image sensing device 100 as indicated by the vector v. The movement of the omnidirectional image sensing device 100 is measured by an attitude sensor. The vector w indicates the changes caused to the image due to camera shake, and thus the vector w corresponds to an amount of correction to be made to reduce the changes caused to the image on the omnidirectional image (spherical image). In the camera-shake correction according to the present embodiment, the relation between the captured image and the omnidirectional image (spherical image) on the spherical coordinates is changed. Note that the distance to the object is taken into considerations in the camera-shake correction according to the present embodiment. Subsequently, an omnidirectional image (spherical image) is generated from the captured image upon reflecting the amount of correction, and an omnidirectional image (spherical image) where the camera shake is reduced can be obtained.

As described above, the movement of the omnidirectional image sensing device 100 in the three-dimensional space is obtained using, for example, an attitude sensor, and the amount of camera-shake correction due to the obtained movement is estimated in a three-dimensional sphere. Due to this configuration, camera shake can be reduced even on a wide-angle image where it is difficult to perform camera-shake correction in a similar manner to the camera-shake correction to be performed on a planar image. Accordingly, it is not necessary to adopt an optical camera-shake correction mechanism and an electronic camera-shake correction mechanism.

In the present disclosure, the expression "obtaining a captured image" is not limited to the processes of capturing an image, and includes the processes of obtaining a captured image from an external device.

The movement of an image processing apparatus refers to at least one of the rotation and the movement in a parallel manner of the image processing device in the three-dimensional space.

A wide-angle image that at least partially involves a curved plane indicates a plane that is at least partially curved. For example, such a wide-angle image that at least partially involves a curved plane may be a part of a sphere, but no limitation is intended thereby. It is satisfactory as long as such a wide-angle image that at least partially involves a curved plane is curbed and not limited to a complete sphere.

Figure 2:
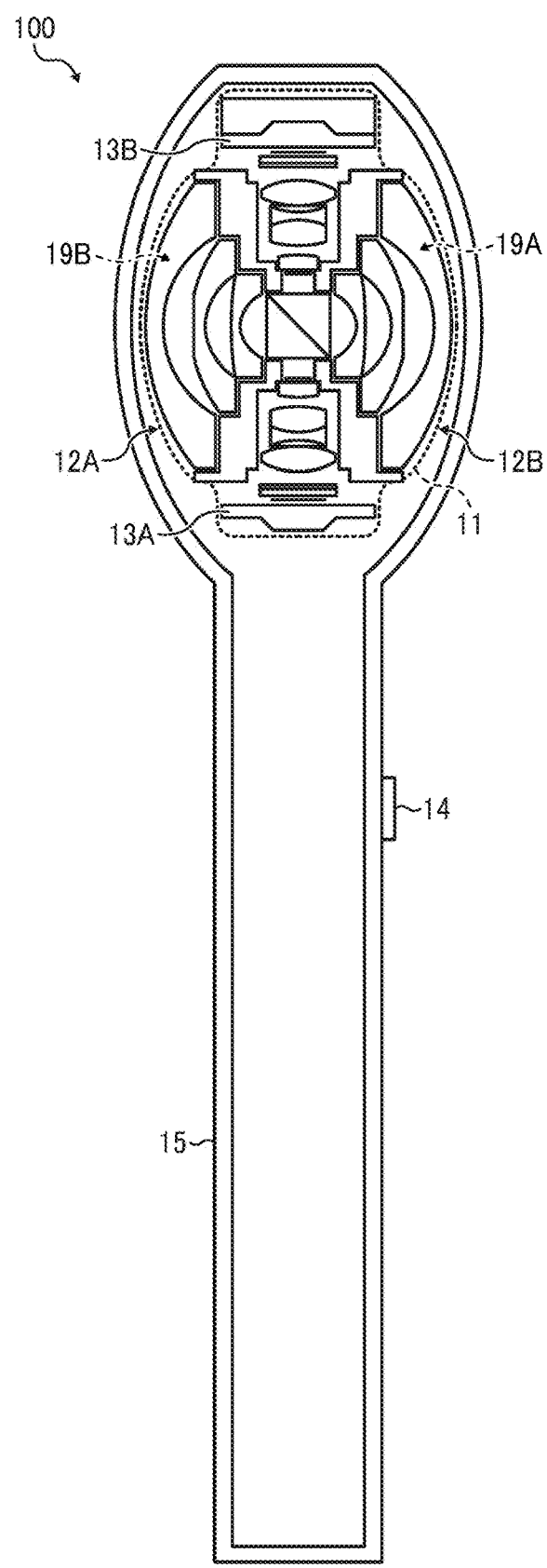
FIG. 2 is a diagram illustrating a sectional view of an omnidirectional image sensing device, according to an embodiment of the present disclosure.

FIG. 2 is a sectional view of the omnidirectional image sensing device 100 according to the present embodiment.

The omnidirectional image sensing device 100 is an imaging device called, for example, an omnidirectional camera. The omnidirectional image sensing device 100 includes an imaging body 11, a housing 15 holding the imaging body 11 and components such as a controller and a battery, and a shutter button 14 provided on the housing 15. The imaging body 11 as illustrated in FIG. 2 includes two image forming optical systems 12A and 12B, and two solid-state image sensing devices 13A and 13B such as a charge coupled device (CCD) sensor or a complementary metal oxide semiconductor (CMOS) sensor. A pair of the image forming optical systems 12A and 12B and the solid-state image sensing devices 13A and 13B is referred to as imaging optical systems 19A and 19B.

Each of the image forming optical systems 12A and 12B includes, for example, six groups of seven fish-eye lenses, and the fish-eye lenses have a full angle of view wider than 180 degrees (=360 degrees/n, where n denotes the number of optical systems and n is 2). Preferably, each of the fish-eye lenses has an angle of view equal to or wider than 185 degrees, and even more preferably, each of the fish-eye lenses has an angle of view equal to or wider than 190 degrees.

The relative positions of the optical elements (lenses, prisms, filters, and aperture stops) of the two image forming optical systems 12A and 12B are determined with reference to the solid-state image sensing devices 13A and 13B. More specifically, positioning is made such that the optical axis of the optical elements of each of the image forming optical systems 12A and 12B is positioned at the central part of the light receiving area of corresponding one of the solid-state image sensing devices 13A and 13B orthogonally to the light receiving area, and such that the light receiving area serves as the imaging plane of corresponding one of the fish-eye lenses.

Figure 3:
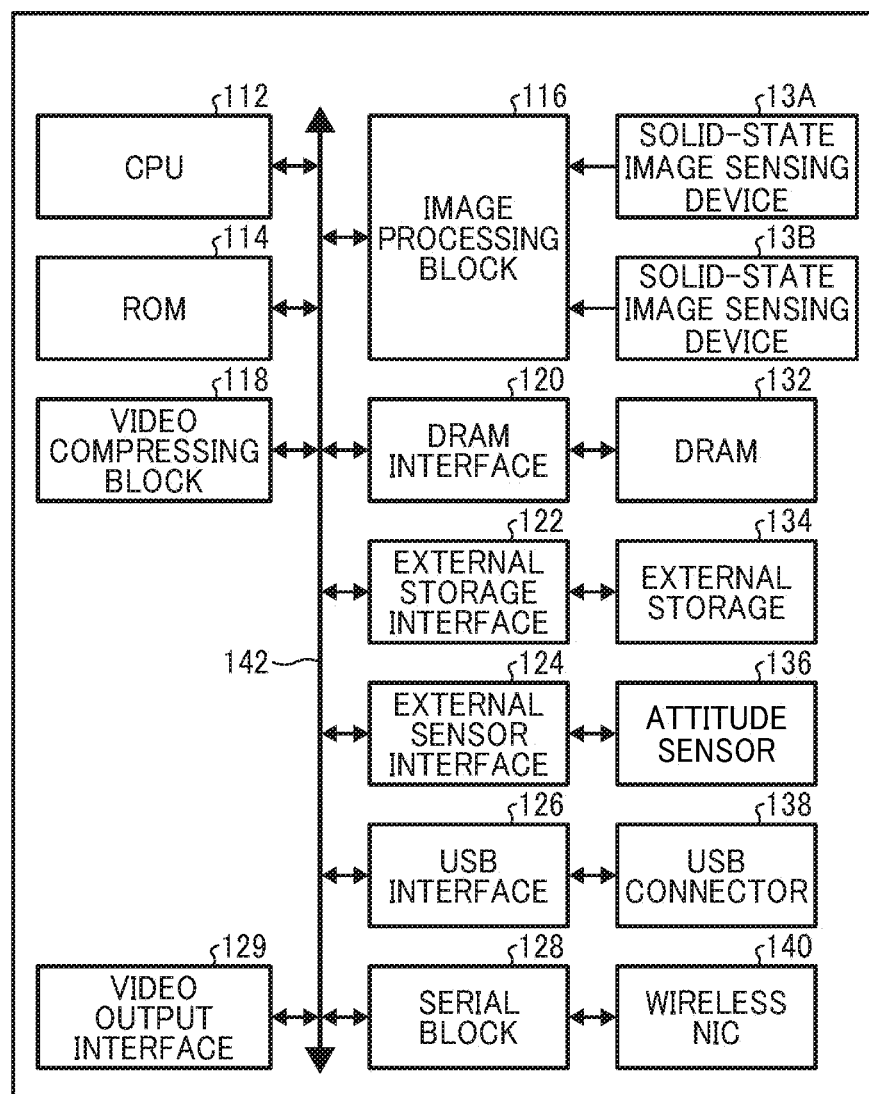
FIG. 3 is a schematic block diagram illustrating a hardware configuration of an omnidirectional image sensing device, according to an embodiment of the present disclosure.

In the omnidirectional image sensing device 100 of FIG. 2, the image forming optical systems 12A and 12B are identical in specifications, and are combined the other way around such that the optical axes of the image forming optical systems 12A and 12B coincide with each other. Each of the solid-state image sensing device 13A and 13B converts the received light into picture signals, and outputs the obtained picture signals to the image processing block 116 as illustrated in FIG. 3. Note that each of the images that are captured as moving images may be referred to as a frame.

As will be described later in detail, the images that are captured by the respective solid-state image sensing devices 13A and 13B are combined so as to generate an image over a solid angle of $4\pi$ [sr: steradian] (hereinafter, such an image is referred to as a "omnidirectional image (spherical image)"). The omnidirectional image (spherical image) is obtained by photographing all the directions viewable from a photographing location. In the present embodiment, an omnidirectional image (spherical image) that is obtained by capturing images in all directions is generated. Alternatively, a so-called panoramic image that is obtained by capturing wide-angle images (for example, in 90 to 360 degrees) only in a horizontal plane may be generated. Such an omnidirectional image (spherical image) may be a part of the 360-degree panorama. Note also that omnidirectional images (spherical images) may be still images or moving images.

FIG. 3 is a schematic block diagram illustrating a hardware configuration of the omnidirectional image sensing device 100, according to the present embodiment.

The omnidirectional image sensing device 100 includes a central processing unit (CPU) 112, a read only memory (ROM) 114, a moving-image compression block 118, a picture output interface 129, an image processing block 116, a dynamic random access memory (DRAM) interface 120, an external storage interface 122, an external sensor interface 124, an universal serial bus (USB) interface 126, and a serial block 128, and these elements are connected to each other via a bus 142.

The CPU 112 executes a program stored in the ROM 114 to control the operations of each component of the omnidirectional image sensing device 100, or executes a program stored in the ROM 114 to control the overall operations of the omnidirectional image sensing device 100. The ROM 114 stores therein a control program described in a code readable by the CPU 112 and various kinds of parameters.

The moving-image compression block 118 is a codec block for compressing and expanding moving images, using, for example, an encoding method in MPEG-4 AVC/H.264 format. The moving-image compression block 118 is used to store the video data of the spherical image generated by the image processing block 116, or to reproduce and output the stored video data.

The picture output interface 129 is an interface to be connected to an external display such as a high-definition multimedia interface (HDMI, registered trademark), and can output the image generated by the image processing block 116 (i.e., an image to be recorded in an external storage, an image being recorded in the external storage, or an image already recorded in an external storage) to such an external display.

The image processing block 116 is connected to the two solid-state image sensing devices 13A and 13B, and obtains the image signals of the images captured by each of the two solid-state image sensing devices 13A and 13B. The image processing block 116 includes, for example, an image signal processor (ISP), and performs, for example, shading correction, Bayer interpolation, white balance correction, and gamma correction to the image signals input from the solid-state image sensing devices 13A and 13B. Further, the image processing block 116 combines the multiple images obtained from the multiple solid-state image sensing devices 13A and 13B to generate a spherical image as described above. The DRAM interface 120 is connected to the DRAM 132, and controls writing of various kinds of data to the DRAM 132 and controls reading various kinds of data from the DRAM 132. The DRAM 132 serves as a working memory when the CPU 112 executes a program, and stores the image data on a temporary basis while the image processing block 116 is processing an image.

The external storage interface 122 is connected to an external storage 134 such as a memory card inserted in a memory card slot. The external storage interface 122 controls reading and writing to the external storage 134.

An attitude sensor 136 is connected to the external sensor interface 124. The attitude sensor 136 is configured by one of an acceleration sensor, a gyroscope sensor, and a geomagnetic sensor, or configured by a combination of the acceleration sensor, the gyroscope sensor, and the geomagnetic sensor, and is used to determine the movement caused to the omnidirectional image sensing device 100.

For example, a triaxial acceleration sensor detects the acceleration along each of the triaxial directions of the omnidirectional image sensing device 100. For example, a three-axis gyroscope sensor detects the angular velocity of the rotation around the three axes of the omnidirectional image sensing device 100. For example, a geomagnetic sensor can measure the direction of the magnetic field (i.e., the direction in north, south, east and west). There may be some cases in which the geomagnetic sensor is referred to as an electronic compass. Each of the outputs from these sensors may be used to obtain the amount of movement or the attitude of the omnidirectional image sensing device 100, or a combination of the outputs from these sensors may be used to obtain the amount of movement or the attitude of the omnidirectional image sensing device 100. Note that the amount of movement or the attitude of the omnidirectional image sensing device 100 is used to correct the camera shake. Further, the data that is obtained from the acceleration sensor of the attitude sensor 136 is used to perform zenith correction on a spherical image.

The USB interface 126 is connected to a USB connector 138. The USB interface 126 controls USB communication with an external device such as a personal computer (PC) connected via the USB connector 138.

The serial block 128 controls serial communication with an external device such as a PC, and is connected to a wireless network interface card (NIC) 140.

In the present embodiment, the external storage interface 122, the USB interface 126, the serial block 128, and the picture output interface 129 are listed as interfaces to which picture data is input and from which picture data is output. Note that the inputting and outputting of the picture is not limited to any specific standard. For example, in an alternative embodiment, connection to an external device may be established through a wired connection such as wired local area network (LAN), another wireless connection such as Bluetooth (registered trademark) and wireless USB, or through another picture output interface such as DisplayPort (registered trademark) and video graphics array (VGA). When the power is turned on and energized by the operation of a power switch, a program stored in the ROM 114 is loaded into the DRAM 132. The CPU 112 follows the program read into the DRAM 132 to control the operations of the parts of the omnidirectional image sensing device 100 as illustrated in blocks in FIG. 3, and stores the data required for the control in the DRAM 132 on a temporary basis. This operation implements the multiple functional units and processes of the omnidirectional image sensing device 100, as will be described later.

Figure 4A:
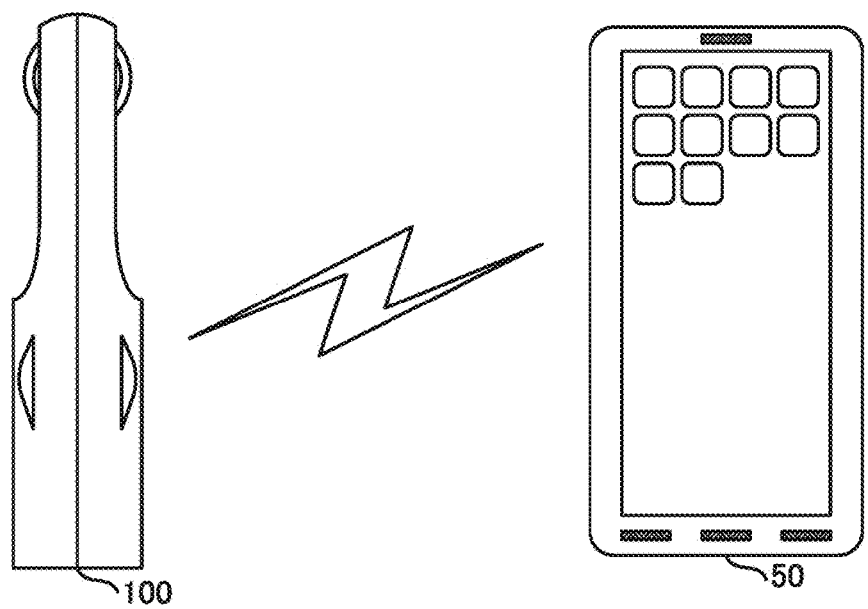
FIG. 4A is a schematic diagram of an omnidirectional image sensing device and a terminal device, according to an embodiment of the present disclosure.

FIG. 4A is a schematic diagram of the omnidirectional image sensing device 100 and the terminal device 50, according to the present embodiment.

As the omnidirectional image sensing device 100 is not provided with a display, in many cases, the omnidirectional image sensing device 100 is used together with the terminal device 50 to display the image data. The omnidirectional image sensing device 100 and the terminal device 50 may be connected to each other through wired connection such as connection through a universal serial bus (USB) cable. Alternatively, the omnidirectional image sensing device 100 and the terminal device 50 may communicate with each other through a wireless connection such as wireless local area network (LAN) and Bluetooth (registered trademark).

By way of example, the terminal device 50 may be a personal computer (PC), a smartphone, tablet personal computer (PC), a mobile phone, a wearable information processing terminal (personal computer (PC)), or a personal digital assistant (PDA).

In the terminal device 50, application software of the omnidirectional image sensing device 100 is operating, and the terminal device 50 receives the image data that is captured by the omnidirectional image sensing device 100 and displays it on a display. Moreover, the terminal device 50 sends various kinds of settings accepted by the terminal device 50 to the omnidirectional image sensing device 100.

Figure 4B:
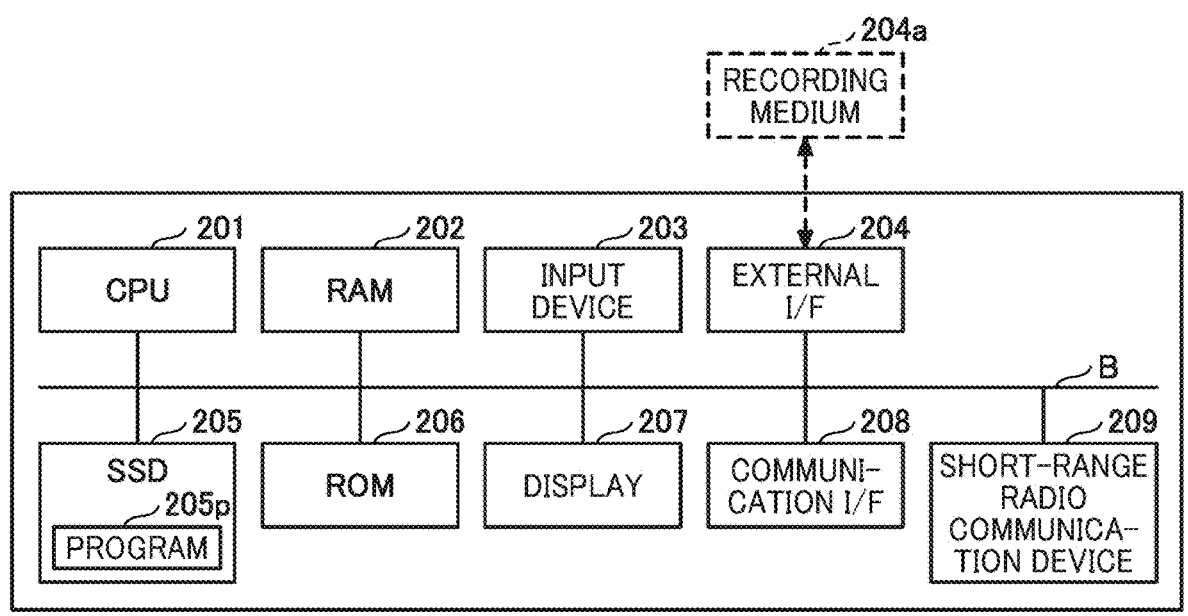
FIG. 4B is a schematic block diagram illustrating a hardware configuration of a terminal device, according to an embodiment of the present disclosure.

FIG. 4B is a schematic block diagram illustrating a hardware configuration of the terminal device 50, according to the present embodiment.

For example, the terminal device 50 is implemented by a hardware configuration as illustrated in FIG. 4B. The terminal device 50 includes, for example, a CPU 201, a RAM 202, an input device 203, an external interface (I/F) 204, a solid state disk (SSD) 205, a ROM 206, a display 207, a communication interface (I/F) 208, and a short-range radio communication device 209, and these elements are interconnected through a bus B.

The CPU 201 loads into the RAM 202 a program 205p or data from a storage device such as the ROM 206 and the SSD 205 and performs processes. Accordingly, the controls or functions of the entirety of the terminal device 50 are implemented.

The input device 203 is, for example, a touch panel, and is used for inputting various kinds of operational signals to the terminal device 50. Note also that the input device 203 may be, for example, a keyboard or a mouse.

The external interface 204 serves as an interface with an external device. For example, the external device includes a recording medium 204a. The recording medium 204a may store a program to implement a display method according to the present embodiment. The terminal device 50 can read data from the recording medium 204a and can write data into the recording medium 204a through the external interface 204.

The recording medium 204a is, for example, a secure digital (SD) memory card. The recording medium 204a may be, for example, a universal serial bus (USB) memory, a digital versatile disk (DVD), a compact disk (CD), and a flexible disk (FD).

The SSD 205 is a read-only nonvolatile storage device that stores a program 205p or data. The program 205p or the data that is stored in the SSD 205 includes, for example, an operating system (OS) that is a basic software for controlling the entirety of the terminal device 50 and an application that provides various kinds of functions on the OS. The SSD 205 manages the stored programs or data by a predetermined file system and/or by a predetermined database (DB). Note also that the terminal device 50 may be provided with, for example, a hard disk drive (HDD), in place of the SSD 205 or in addition to the SSD 205.

The RAM 202 is a volatile semiconductor memory (storage device) that temporarily stores data or a computer program. The ROM 206 is a read-only nonvolatile storage device that can store a computer program or data even when the power is switched off. The ROM 206 stores a computer program or data that is executed when the terminal device 50 starts up, such as a basic input/output system (BIOS), the settings of the operating system (OS), and the settings of the network.

The display 207 is, for example, a liquid crystal display (LCD), and displays a result of the operation of the terminal device 50.

The communication interface 208 is an interface that connects the terminal device 50 to the network. The communication interface 208 may be an interface that is connected to, for example, the mobile phone network or the Internet. More specifically, the communication interface 208 may be, for example, a communication device that uses the wireless local area network (LAN) and a communication device that performs communication through the mobile phone network.

The short-range radio communication device 209 performs radio communication in accordance with a wireless technology standard such as the Bluetooth (registered trademark) and the near-field communication (NFC). In the case of the NFC, the short-range radio communication device 209 may be referred to as, for example, the reader and writer of an integrated circuit (IC) card. Due to this configuration, the terminal device 50 can perform data communication with the omnidirectional image sensing device 100 through the short-range radio communication device 209.

Figure 5:
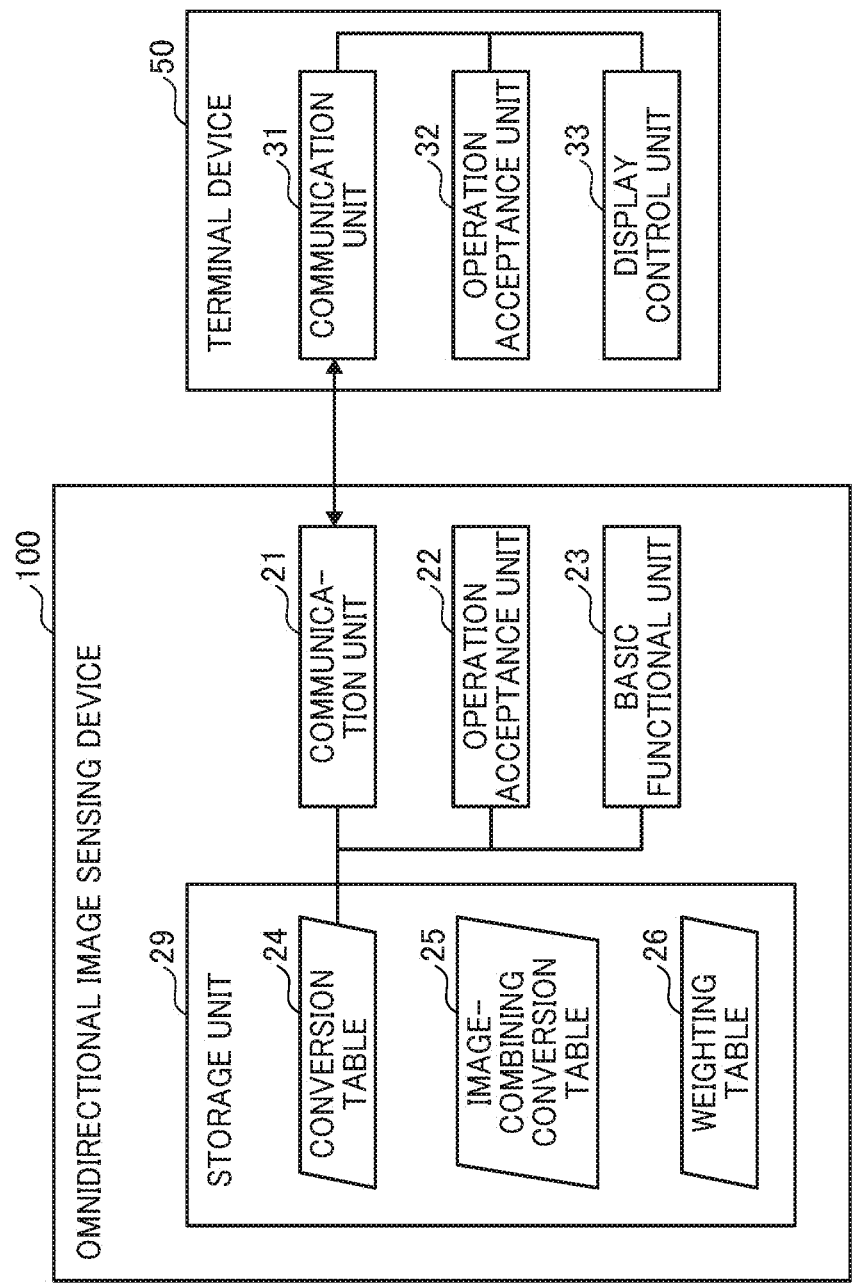
FIG. 5 is a schematic block diagram illustrating a functional configuration of an omnidirectional image sensing device and a terminal device, according to an embodiment of the present disclosure.

FIG. 5 is a schematic block diagram illustrating a functional configuration of the omnidirectional image sensing device 100 and the terminal device 50, according to the present embodiment.

The omnidirectional image sensing device 100 includes a communication unit 21, an operation acceptance unit 22, and a basic functional unit 23. The communication unit 21 exchanges various kinds of data with the terminal device 50. In the present embodiment, image data may be sent from the omnidirectional image sensing device 100 to the terminal device 50, or the omnidirectional image sensing device 100 may receive various kinds of settings from the terminal device 50. The communication unit 21 is implemented, for example, as the CPU 112 illustrated in FIG. 3 executes a program stored in the ROM 114 to control the wireless NIC 140.

The operation acceptance unit 22 accepts user's operation such as the turning on and turning off of the power supply and the depressing of a shutter button. The operation acceptance unit 22 is implemented, for example, as the CPU 112 illustrated in FIG. 3 executes a program stored in the ROM 114.

The basic functional unit 23 performs the basic functions of the omnidirectional image sensing device 100 as an imaging device. In other words, the basic functional unit 23 generates image data. The basic functional unit 23 is implemented, for example, as the CPU 112 illustrated in FIG. 3 executes a program stored in the ROM 114 to control the image processing block 116 and the moving-image compression block 118.

The omnidirectional image sensing device 100 includes a storage unit 29 that is implemented by at least one of the ROM 114 and the DRAM 132 as illustrated in FIG. 3. As will be described later, the storage unit 29 stores a conversion table 24, an image-combining conversion table 25, and a weighting table 26. As will be described later in detail, in the conversion table 24, the coordinates (x, y) of a partial-view image are associated with the spherical coordinates (θ, φ). In the image-combining conversion table 25, the relation between the coordinates (x, y) and the spherical coordinates (θ, φ) is changed as two partial-view images are joined together and the zenith is corrected. In the weighting table 26, the degree of camera-shake correction is changed according to the distance to an object.

On the other hand, the terminal device 50 includes a communication unit 31, an operation acceptance unit 32, and a display control unit 33. The other functions that the terminal device 50 may involve are omitted as such functions are insignificant in the description of the present embodiment.

The communication unit 31 exchanges various kinds of data with the omnidirectional image sensing device 100. In the present embodiment, the communication unit 31 of the terminal device 50 may receive image data from the omnidirectional image sensing device 100, or may send various kinds of settings to the omnidirectional image sensing device 100. The communication unit 31 is implemented, for example, as the CPU 201 illustrated in FIG. 4B executes the program 205p stored in the SSD 205 to control the communication interface 208.

The operation acceptance unit 32 accepts various kinds of operation made by an user for the terminal device 50. In the present embodiment, as will be described later in detail, the operation acceptance unit 32 accepts settings on the weighting table. The operation acceptance unit 32 is implemented, for example, as the CPU 201 illustrated in FIG. 4B executes the program 205p stored in the SSD 205 to control the input unit 203.

The display control unit 33 displays various kinds of screen images that are generated by application software on the display 207. In the present embodiment, image data and a configuration screen are displayed on the display 207. The display control unit 33 is implemented, for example, as the CPU 201 illustrated in FIG. 4B executes the program 205p stored in the SSD 205 to control the display 207.

Next, the image processing block 116 of the omnidirectional image sensing device 100 is described with reference to FIG. 6A and FIG. 6B. The omnidirectional image sensing device 100 is an image processing apparatus that performs various kinds of image processing.

Figure 6A:
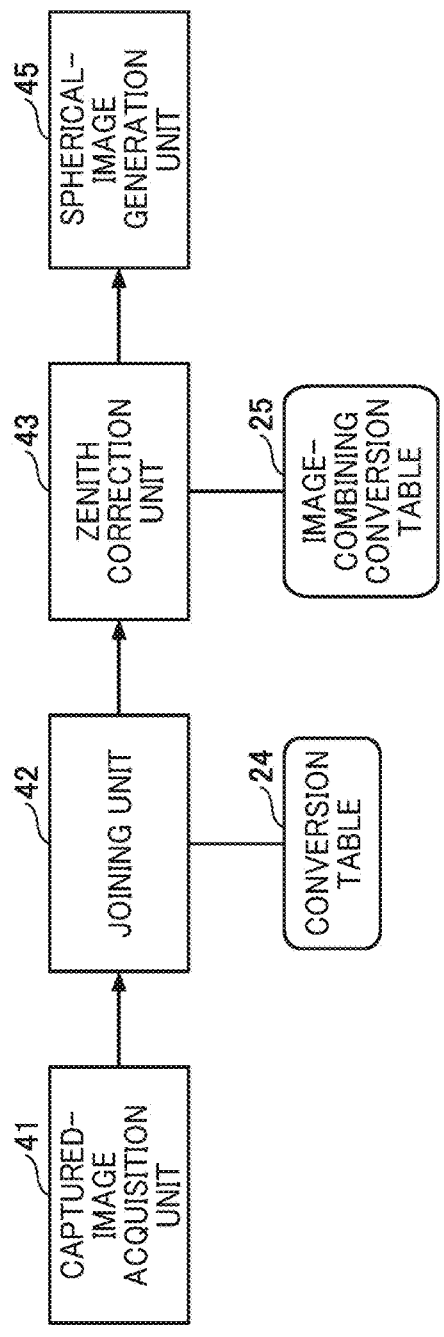
FIG. 6A and FIG. 6B are diagrams each illustrating functions of an image processing block, according to an embodiment of the present disclosure.

FIG. 6A is a diagram illustrating functional blocks of the image processing block 116 that does not involve any camera-shake correction capability, according to the present embodiment.

Figure 6B:
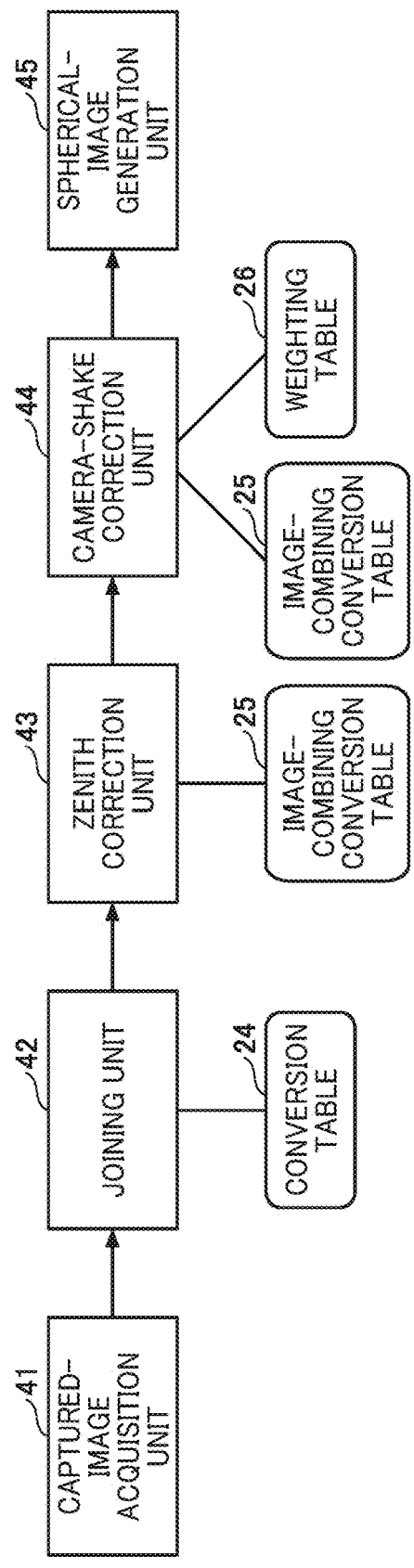

FIG. 6B is a diagram illustrating functional blocks of the image processing block 116 that involves camera-shake correction capability, according to the present embodiment.

Even if a camera-shake correction unit 44 as depicted in FIG. 6B is added, as will be described later, the existence or nonexistence of such a camera-shake correction unit 44 does not affect the operation of a spherical-image generation unit 45.

It is assumed that the image processing block 116 as illustrated in FIG. 6A and FIG. 6B is implemented by hardware circuitry such as an application specific integrated circuit (ASIC), a field programmable gate array (FPGA), and large scale integration (LSI).

Figure 7:
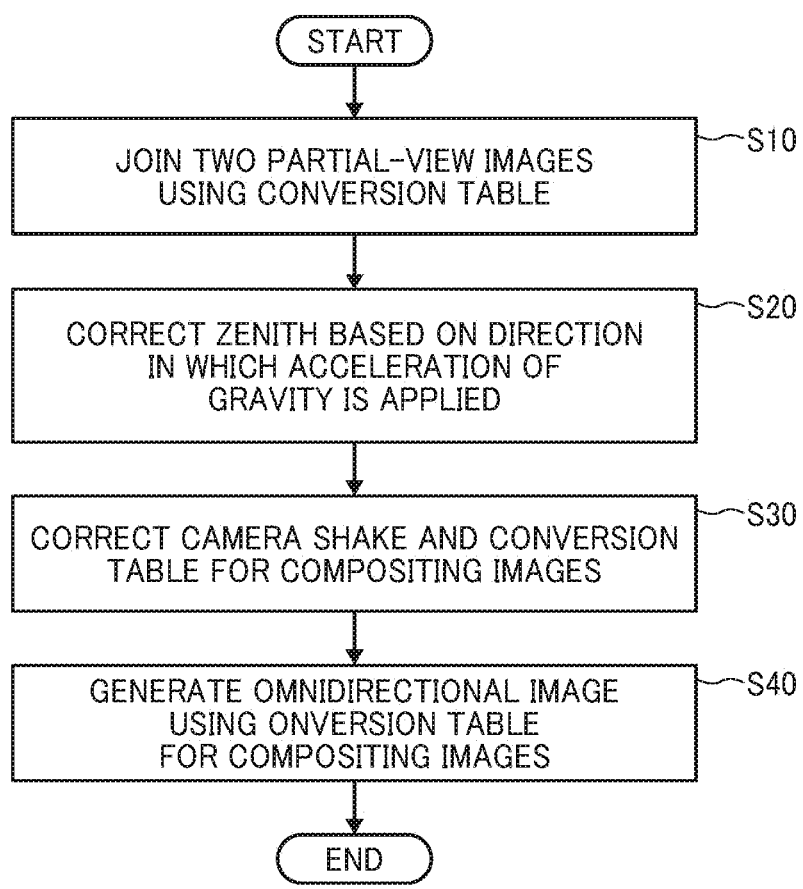
FIG. 7 is a flowchart of an overall operations sequence of an omnidirectional image sensing device, according to an embodiment of the present disclosure.

FIG. 7 is a flowchart of an overall operations sequence of the omnidirectional image sensing device 100, according to the present embodiment.

Step S10: As each of the solid-state image sensing devices 13A and 13B captures an object existing in a peripheral area, two partial-view images are obtained. The joining unit 42 joins these two partial-view images using a conversion table.

Step S20: Due to the joining processes, one omnidirectional image (spherical image) can be obtained. Then, a zenith correction unit 43 corrects the zenith based on the direction in which the acceleration of gravity is applied. More specifically, the orientation of the omnidirectional image (spherical image) is rotated, and thus the conversion table 24 is also rotated. Due to this configuration, the image-combining conversion table 25 is generated.

Step S30: Next, the camera-shake correction unit 44 corrects the camera shake. More specifically, the relation between the coordinates (x, y) of a partial-view image and the spherical coordinates (θ, φ) in the image-combining conversion table 25 is corrected in such camera-shake correction.

Step S40: The spherical-image generation unit 45 generates an omnidirectional image (spherical image) using the image-combining conversion table 25.

Next, the functions and operations sequence of the omnidirectional image sensing device 100 are described in detail.

The captured-image acquisition unit 41 controls the above two solid-state image sensing devices 13A and 13B to obtain a captured image (partial-view image) from each of the solid-state image sensing devices 13A and 13B.

Figure 8A:
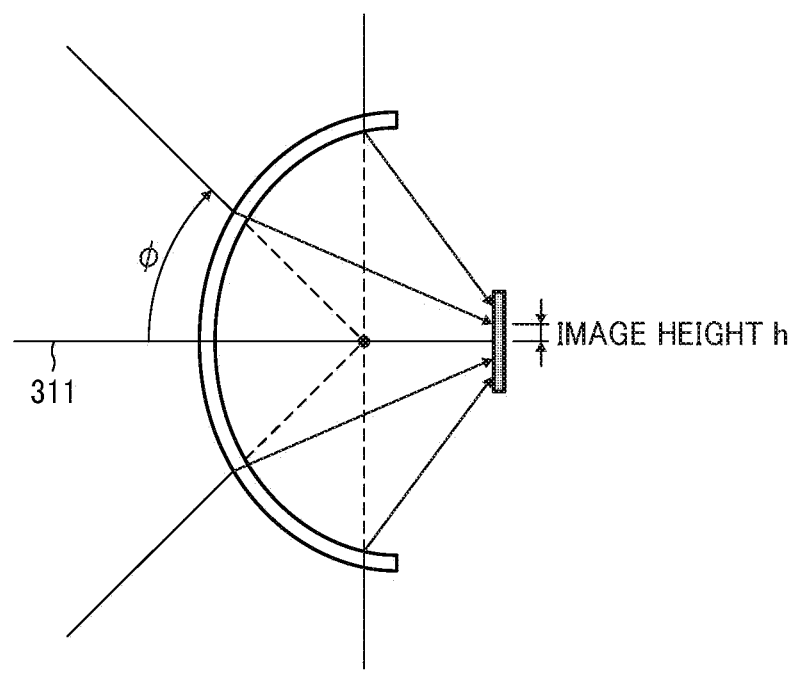
FIG. 8A and FIG. 8B are diagrams illustrating a projection relation in an imaging system where a fish-eye lens is used, according to an embodiment of the present disclosure.
Figure 8B:
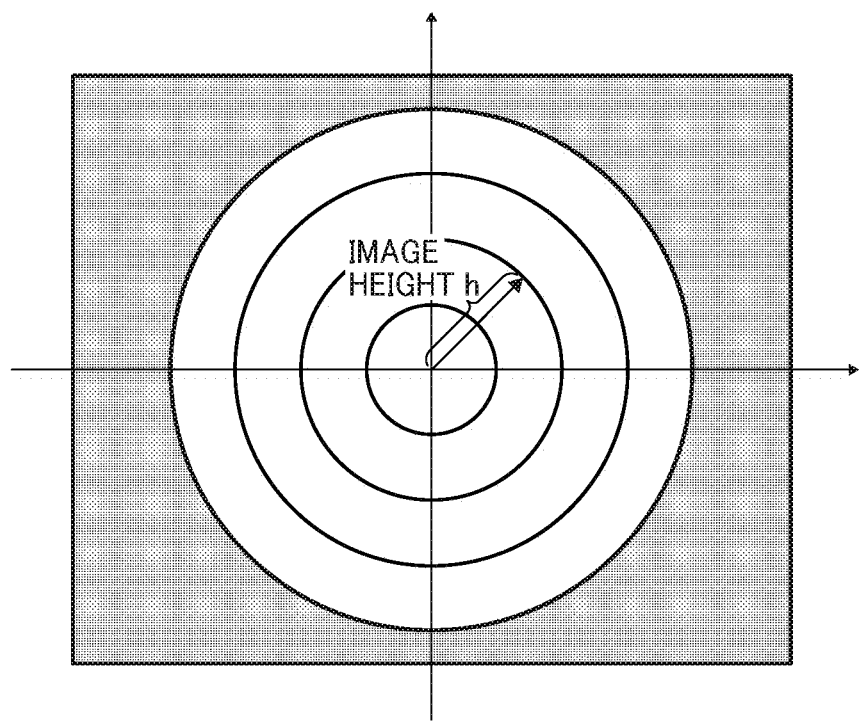

FIG. 8A and FIG. 8B are diagrams illustrating a projection relation in an imaging system where a fish-eye lens is used, according to the present embodiment.

In the present embodiment, an image captured by one fish-eye lens is an image obtained by capturing an orientation range of substantially a hemisphere with reference to a photographing location. As illustrated in FIG. 8A, the fish-eye lens generates an image having an image height h that corresponds to an angle of incidence φ with reference to an optical axis 311. The relation between the image height h and the angle of incidence φ is determined by a projection function according to a prescribed projection model. The projection function varies according to the properties and characteristics of the fish-eye lens. When a fish-eye lens that adopts a projection model called the equidistant projection is used, the projection function is indicated by [Formula 1] given below where f denotes the focal length.

[Formula 1]

$$h = f \times \phi \quad (1)$$

The projection model may be any of the central projection (h=f*tan φ), the stereographic projection (h=2f*tan (φ/2)), the equi-solid-angle projection (h=2f*tan (φ/2)), and the orthogonal projection (h=f*sin φ). In any of the projections, the image height h of a formed image is determined according to the incident angle φ and the focal length f with reference to the optical axis 311. In the present embodiment, the configuration of a so-called circular fish-eye lens that has an image circle diameter shorter than a diagonal line of the image is adopted. As illustrated in FIG. 8B, the partial-view image obtained from the lens is a planar image including the entire image circle obtained by projecting the captured range of substantially a hemisphere.

Next, the processes that are performed by the joining unit 42 are described with reference to FIG. 9A, FIG. 9B, FIG. 10A, FIG. 10B, FIG. 11A, and FIG. 11B.

Figure 9A:
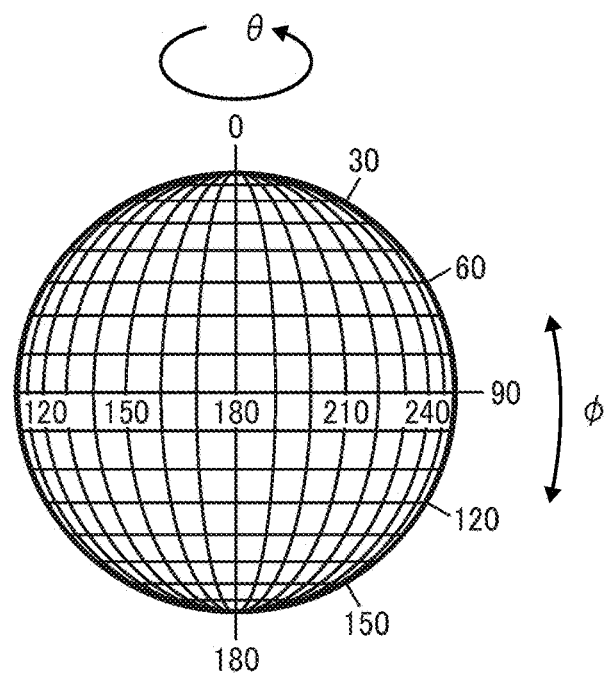
FIG. 9A and FIG. 9B are diagrams illustrating the data structure of image data in an omnidirectional image format, according to an embodiment of the present invention.
Figure 9B:
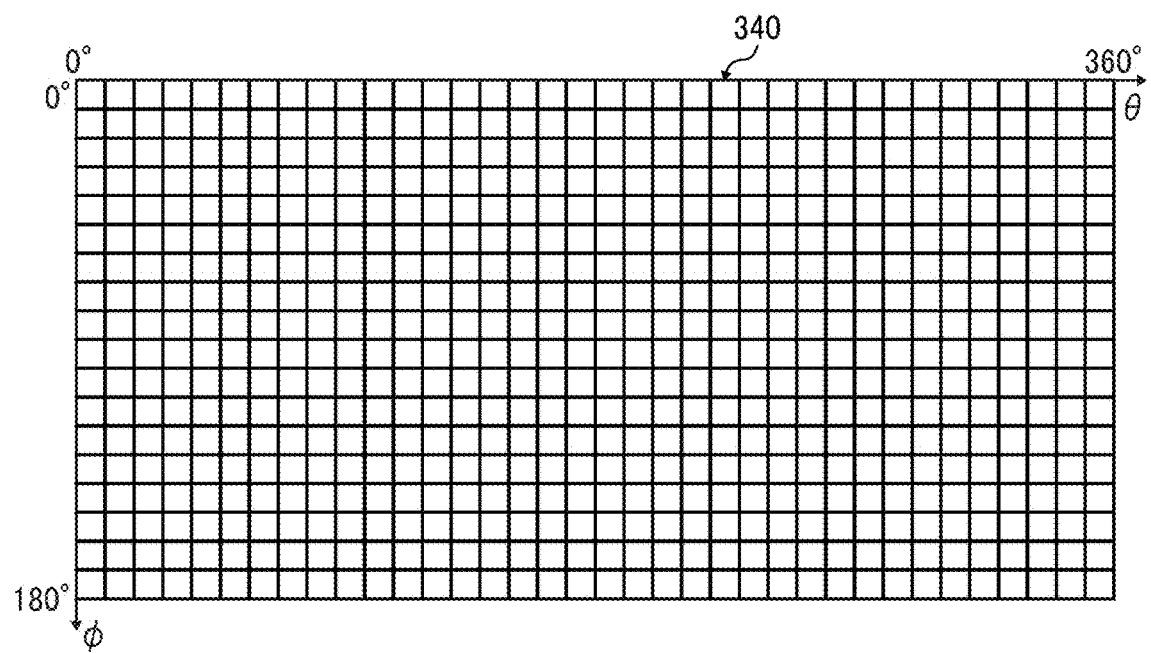

FIG. 9A and FIG. 9B are diagrams illustrating the data structure of image data in an omnidirectional image format 340, according to the present embodiment.

As illustrated in FIG. 9A and FIG. 9B, the image data in the omnidirectional image format 340 is expressed as an array of pixel values where the vertical angle φ corresponding to the angle with reference to a certain axis and the horizontal angle θ corresponding to the angle of rotation around the axis are the coordinates. The horizontal angle θ ranges from 0 to 360 degrees (alternatively, expressed as from −180 to +180 degrees). In a similar manner, the vertical angle φ ranges from 0 to 180 degrees (alternatively, expressed as from −90 to +90 degrees). The coordinate values (θ, φ) are associated with the points on the spherical surface indicating all directions around the photographing location, and the all directions are mapped on the omnidirectional image (spherical image). The planar coordinates of an image that is captured by a fish-eye lens can be associated with the spherical coordinates of the image in the omnidirectional image format 340, using the projection function as described above with reference to FIG. 8A and FIG. 8B.

Figures 10A, 10B:
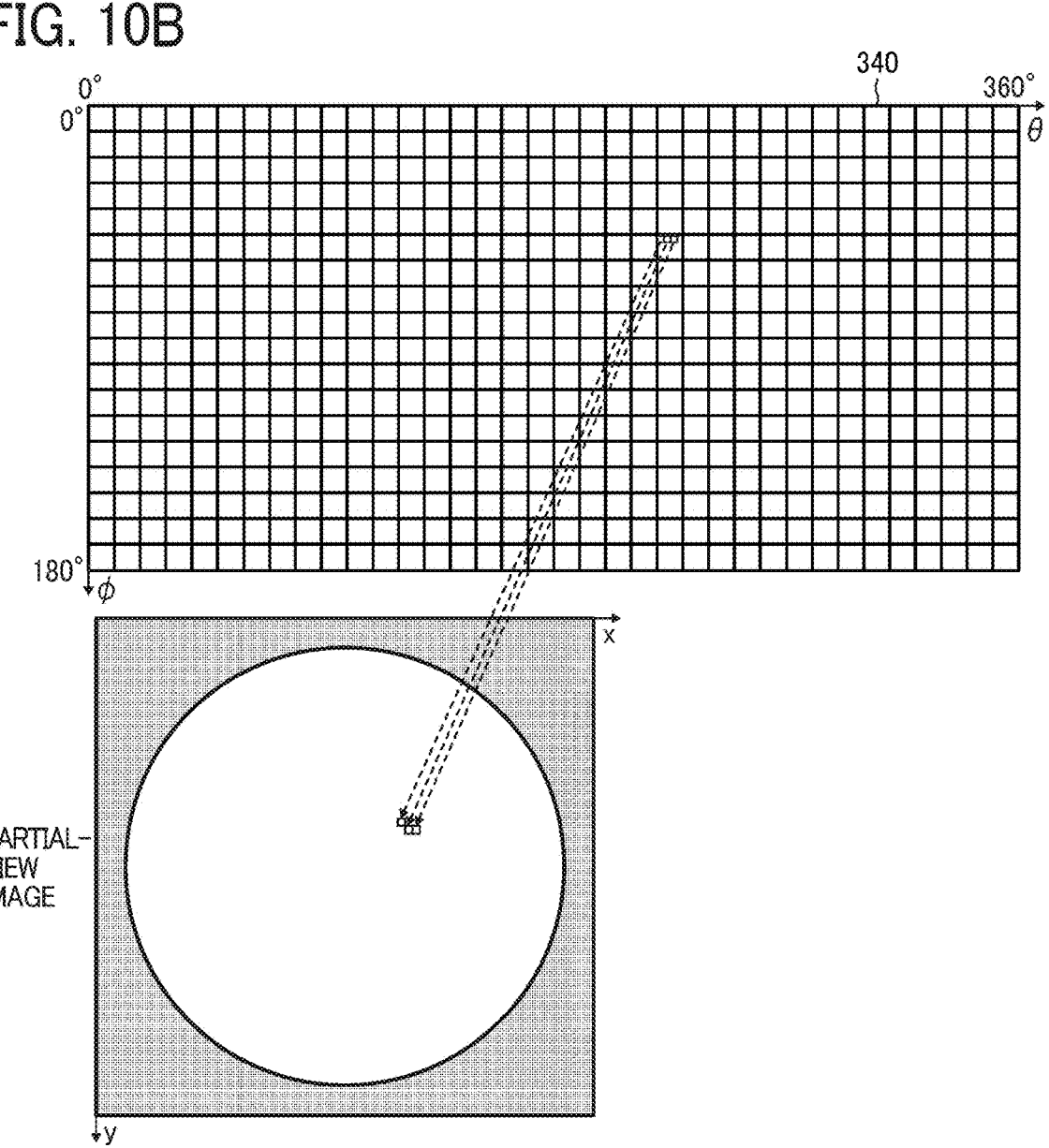
FIG. 10A and FIG. 10B are diagrams illustrating a conversion table in which the planar coordinates of a partial-view image and the spherical coordinates of the partial-view image are associated with each other, according to an embodiment of the present disclosure.

FIG. 10A and FIG. 10B are diagrams illustrating a conversion table 24 in which the planar coordinates of a partial-view image and the spherical coordinates of the partial-view image are associated with each other, according to the present embodiment.

FIG. 10A depicts the conversion table 24 according to the present embodiment.

FIG. 10B is a schematic diagram illustrating how the planar coordinates and the spherical coordinates are associated with each other using the conversion table 24, according to the present embodiment.

As illustrated in FIG. 10A and FIG. 10B, for each fish-eye lens, the conversion table 24 provides the associating information between the coordinate values (θ, φ) of the post-correction images and the coordinate values (x, y) of the pre-correction partial-view images that are mapped on the coordinate values (θ, φ), for all the coordinate values (θ, φ), where θ denotes 0 to 360 degrees and φ denotes 0 to 180 degrees. In the illustration of FIG. 10A and FIG. 10B, the angle of each one of the pixels is one-tenths of a degree in both φ direction and θ direction, and the conversion table 24 includes the data indicating the 3600×1800 corresponding relation for each fish-eye lens.

For example, the manufacturer of the omnidirectional image sensing device 100 corrects the distortion in advance with reference to an optimal lens model due to, for example, radiant distortion and decentered distortion, according to, for example, lens design data, and based on the projection relation of a lens as described above with reference to FIG. 8A and FIG. 8B. Then, the conversion table 24 that is used in joining processes is calculated and generated. The conversion table 24 may be coefficient data including one or more functions that set out the projection of a partial-view image (x, y) expressed in a planar coordinate system as an image (θ, φ) expressed in a spherical coordinate system.

FIG. 11A and FIG. 11B are diagrams illustrating how the two partial-view images 0 and 1 that are captured by two fish-eye lenses 0 and 1 are mapped on a spherical coordinate system, according to the present embodiment.

In FIG. 11A, the lenses 0 and 1 and the optical axis 311 are illustrated. In FIG. 11B, the overlapping area between a corrected image for position detection 0 and a corrected image for position detection 1 are illustrated. Moreover, the relation among two partial-view images 0 and 1, the corrected image for position detection 0 and the corrected image for position detection 1, and the spherical coordinate system is illustrated.

The two partial-view images 0 and 1 that are captured by the fish-eye lenses 0 and 1 is developed in the omnidirectional image format 340 using the conversion table 24. Typically, the partial-view image 0 that is captured by the fish-eye lens 0 is approximately mapped on an upper hemisphere of the whole sphere, and the partial-view image 1 that is captured by the fish-eye lens 1 is approximately mapped on a lower hemisphere of the whole sphere. As the full angles of view of the fish-eye lenses exceed 180 degrees, each of the partial-view images 0 and 1 that are expressed in the omnidirectional image format 340 lies off the hemisphere. For this reason, when the corrected image for position detection 0 and the corrected image for position detection 1 are superimposed on top of one another, an overlapping area 330 occurs in which the captured ranges of these two images overlap with each other.

If each partial-view image is simply converted into an image in the omnidirectional image format 340 using the conversion table 24, misalignment occurs for the images in the overlapping area 330. This is because the conversion table 24 is generated merely based on calculation and for example, an error in installing fish-eye lens occurs when the omnidirectional image sensing device 100 is manufactured. In order to handle such a situation, as illustrated in FIG. 12, the alignment of the overlapping area 330 is performed.

Figure 12:
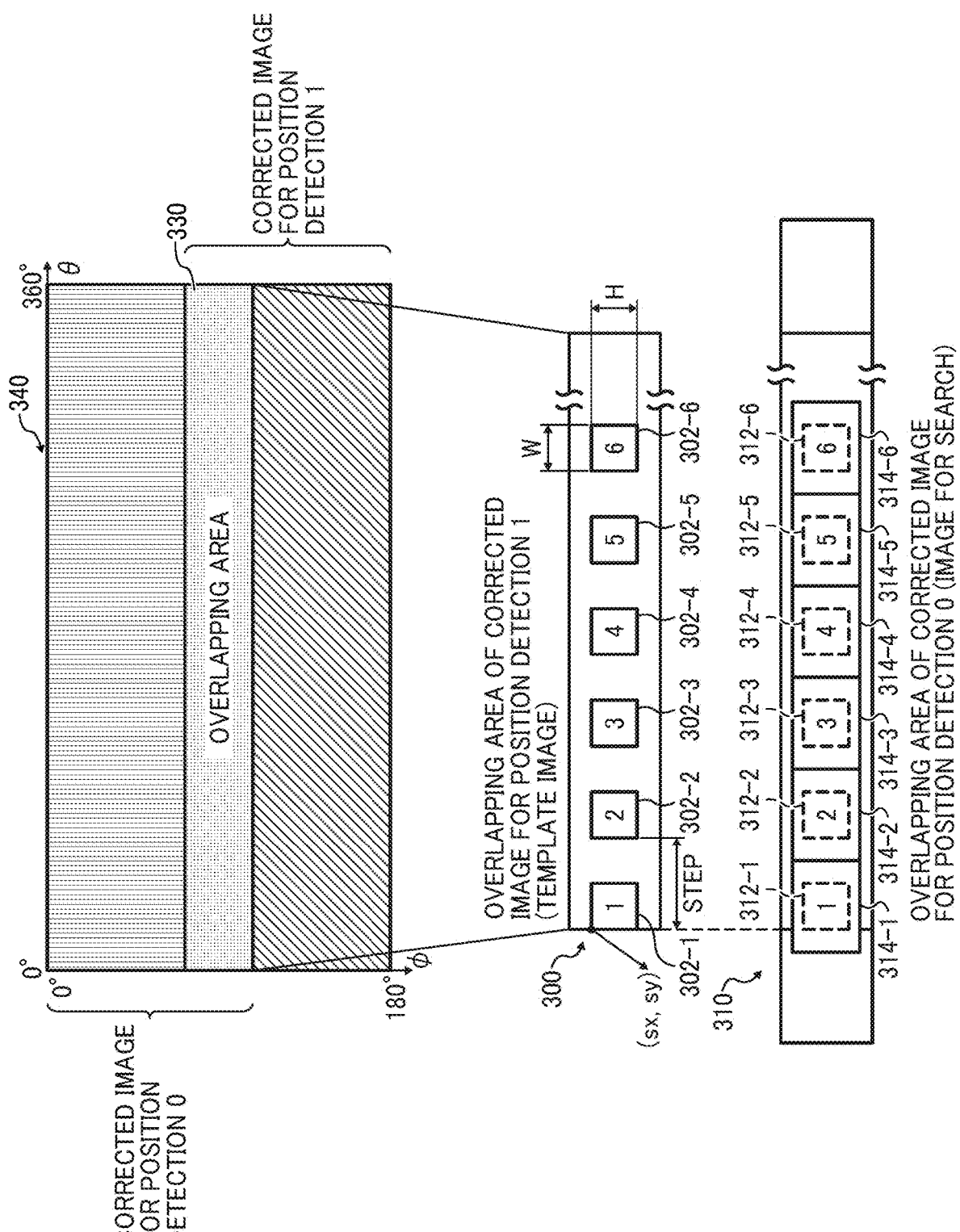
FIG. 12 is a diagram illustrating the alignment of an overlapping area, according to an embodiment of the present disclosure.

FIG. 12 is a diagram illustrating the alignment of the overlapping area 330, according to the present embodiment.

In the omnidirectional image format 340, the portions that correspond to the partial-view image 0 is referred to as the corrected image for position detection 0, and the portions that correspond to the partial-view image 1 is referred to as the corrected image for position detection 1. In FIG. 12, a template image 300 corresponds to the overlapping area 330 of the corrected image for position detection 1, and an image for search 310 corresponds to the overlapping area 330 of the corrected image for position detection 0. In the overlapping area 330, blocks 302 and blocks 312 are generated for matching (branch numbers 1 to 6 are given to each block). Each block is a square whose side is shorter than the height of the overlapping area 330 (alternatively, the blocks may be rectangles or other kinds of polygons). The joining unit 42 generates the blocks 302 and the blocks 312 in the overlapping area 330 at predetermined generation intervals. The size of the blocks and the intervals at which the blocks are generated may be determined in view of the desired precision of the matching and the desired processing speed of the matching.

In the present embodiment, that the size of the blocks is indicated by W×H pixels and the coordinates of the point where the blocks 302 of the template image 300 start being generated are (sx, sy). Moreover, the intervals at which the blocks are generated are the length of pixels indicated by "step." Accordingly, as in the example illustrated in FIG. 12, a plurality of blocks 302-1 to 302-6 are generated. The blocks 302 of the template image 300 become a template. The number of the blocks 302 as a template is an integral number of the value obtained by dividing the width size of the omnidirectional image (spherical image) (=3600 pixels) by the generation intervals (steps).

Next, blocks 312-1 to 312-6 of the image for search 310 are searched for based on these multiple blocks 302-1 to 302-6 as generated above. Note also that the both ends of the omnidirectional image format 340 in the θ coordinate (0 degree and 360 degrees) are to be combined. Accordingly, when blocks are generated or template matching is performed, the next to the right end can be handled as the left end, and the next to the left end can be handled as the right end.

In the present embodiment, the positions of the blocks 312-1 to 312-6 that most precisely match the blocks 302-1 to 302-6 are unknown. Accordingly, the joining unit 42 calculates the amount of characteristics of the blocks 302 of the template image 300, and calculates the amount of characteristics at corresponding positions 314 on the image for search 310. Then, the degree of similarity between the amount of characteristics in the template image 300 and the amounts of characteristics in the image for search 310, and the degree of similarity is calculated again while shifting in the horizontal direction within range of the width of "step" by one pixel. These calculations are repeated. The amount of shift where the amounts of characteristics have the highest degree of similarity within range of the width of "step" indicates the matching areas of the overlapping area between the corrected image for position detection 0 and the corrected image for position detection 1 (blocks 312-1 to 312-6).

In FIG. 12, shifting is performed in the θ direction. However, if the blocks are shifted in the φ direction, the matching position where the degree of similarity is highest in both the θ direction and the φ direction can be determined. The joining unit 42 associates the amount of shift (Δθ, Δφ) with the coordinate values (θ, φ) in the conversion table of the partial-view image 0. When shifting is performed only in the θ direction, Δφ may be zero. Note that in the conversion table used to correct the distortion on the partial-view image 1, it is not necessary to make a correction to change the associating relation.

Due to this configuration, the two partial-view images 0 and 1 can be joined together at the position where the two partial-view images 0 and 1 most precisely match.

As illustrated in FIG. 11B, in the above conversion table, the up-and-down directions in the omnidirectional image format 340 do not match the zenith direction of the captured scene as the optical axis 311 is oriented in the pole of the spherical surface (fish-eye lens) and the overlapping portion of two images is projected around the equator of the spherical surface.

The zenith correction unit 43 detects the attitude of the omnidirectional image sensing device 100, and corrects the generated omnidirectional image (spherical image) such that the zenith direction of the omnidirectional image matches a prescribed reference direction. Typically, the prescribed reference direction refers to a vertical direction in which the acceleration of gravity is applied. By correcting the generated spherical image such that the zenith direction of the spherical image matches the vertical direction (i.e., the zenith direction), the possibility of causing awkwardness such as simulator sickness to a user can be prevented even when the field of view is changed while an image is being viewed. Such prevention of awkwardness such as simulator sickness is effective particularly in moving images.

The zenith correction unit 43 rotates the coordinates of the corrected conversion table to generate the image-combining conversion table 25.

Figure 13:
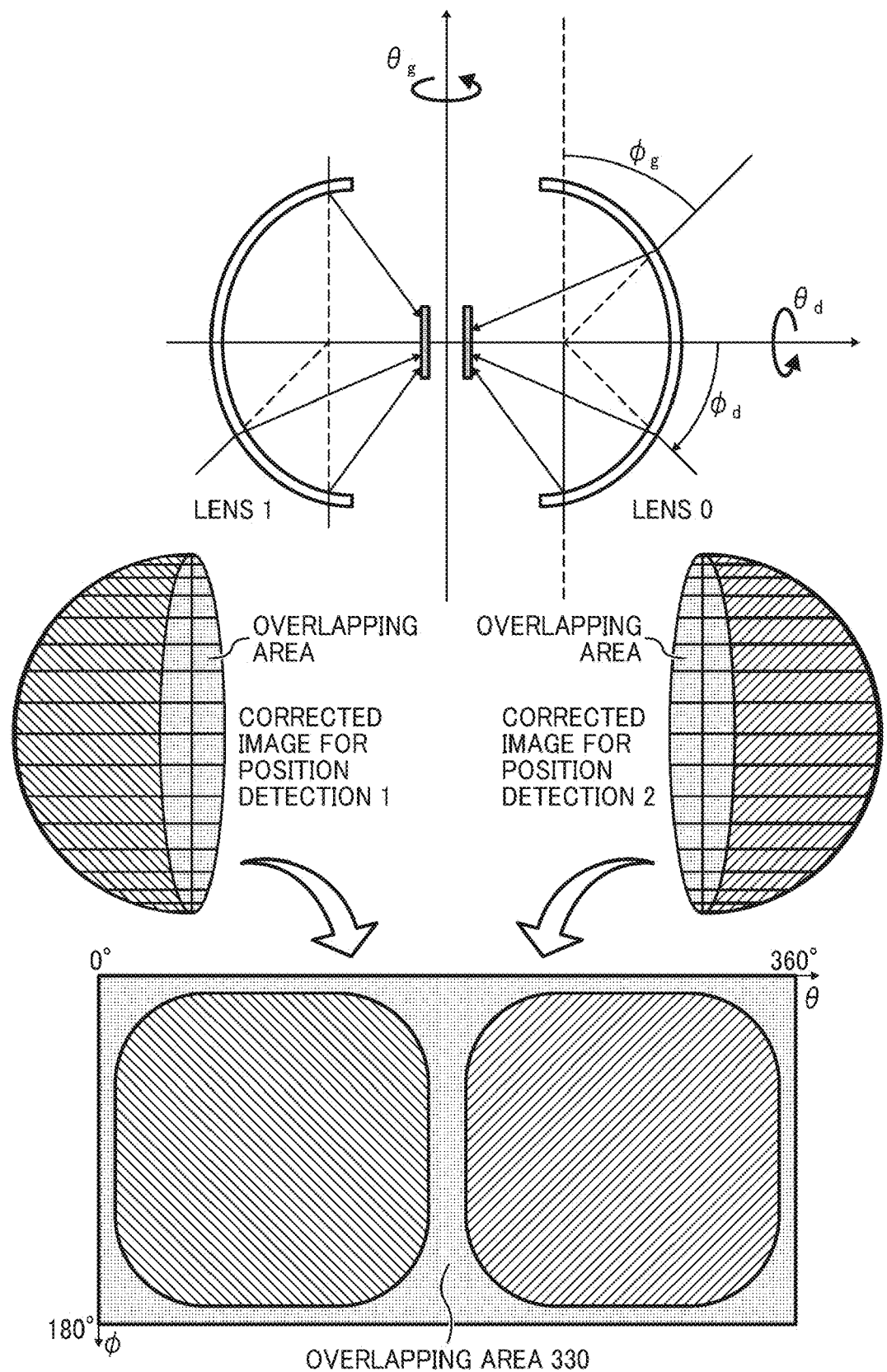
FIG. 13 is a diagram illustrating how the two partial-view images that are captured by two fish-eye lenses are mapped on a spherical coordinate system, according to an embodiment of the present disclosure.

FIG. 13 is a diagram illustrating how the two partial-view images that are captured by two fish-eye lenses are mapped on a spherical coordinate system, according to the present embodiment.

The zenith correction unit 43 performs rotational coordinate transformation to calculate the coordinate values ($\theta_d$, $\varphi_d$), which correspond to the coordinate values ($\theta_g$, $\varphi_g$), for joining position detection in the spherical coordinate system. Due to the rotational coordinate transformation as described above, the definition of the coordinates of the horizontal angle $\theta_d$ and vertical angle $\varphi_d$ with reference to the optical axis 311 of one of the lens optical systems, as illustrated in FIG. 11A, is converted into the definition of the coordinates of the horizontal angle $\theta_g$ and vertical angle $\varphi_g$ with reference to the optical axis 311 perpendicular to the optical system, as illustrated in FIG. 13. The Formula 2 given below indicates the above rotational coordinate transformation.

The coordinates ($\theta_g$, $\varphi_g$) are the spherical coordinates for combining images in the spherical coordinate system. The three-dimensional rectangular coordinates (xg, yg, zg) are the three-dimensional rectangular coordinates that correspond to the coordinates ($\theta_g$, $\varphi_g$). The coordinates ($\theta_d$, $\varphi_d$) are the spherical coordinates used for image joining processes. The three-dimensional rectangular coordinates (xd, yd, zd) are the three-dimensional rectangular coordinates that correspond to the coordinates ($\theta_d$, $\varphi_d$). The coefficient $\beta$ in the Formula 2 indicates the angle of rotation that defines the rotational coordinate transformation around the X-axis in the three-dimensional rectangular coordinates. In the present embodiment, the coefficient $\beta$ in the Formula 2 indicates the angle that the optical axis forms with the acceleration of gravity (about 90 degrees).

[Formula 2]

$$\begin{aligned} x_g &= \sin(\phi_g)\cos(\theta_g) \\ y_g &= \sin(\phi_g)\sin(\theta_g) \\ z_g &= \cos(\phi_g) \\ \begin{pmatrix} x_d \\ y_d \\ z_d \end{pmatrix} &= \begin{pmatrix} 1 & 0 & 0 \\ 0 & \cos\beta & \sin\beta \\ 0 & -\sin\beta & \cos\beta \end{pmatrix} \begin{pmatrix} x_g \\ y_g \\ z_g \end{pmatrix} \\ \phi_d &= \mathrm{Arccos}(z_d) \\ \theta_d &= \mathrm{Arctan}\left(\frac{y_d}{x_d}\right) \end{aligned} \quad (2)$$

Due to the Formula 2, the relation between the coordinates ($\theta_g$, $\varphi_g$) and the coordinates ($\theta_d$, $\varphi_d$) can be obtained. Then, the zenith correction unit 43 searches for the spherical coordinates ($\theta$, $\varphi$) in the conversion table 24 using the coordinates ($\theta_d$, $\varphi_d$), and replaces the spherical coordinates ($\theta$, $\varphi$) in the conversion table 24 with the coordinates ($\theta_g$, $\varphi_g$). Due to this configuration, the image-combining conversion table 25 is generated.

Accordingly, in the image-combining conversion table 25, the optical axis is projected on the equator of the spherical surface, and the up-and-down directions in the omnidirectional image format 340 match the zenith direction of the captured scene.

The spherical-image generation unit 45 generates an omnidirectional image (spherical image) from two captured partial-view images 0 and 1 in view of the processing results of the joining unit 42 and the zenith correction unit 43. As described above, the conversion table 24, which is used to generate an omnidirectional image (spherical image) from the two partial-view images 0 and 1, is prepared in advance, and the joining unit 42 reflects the result of the joining position detection in the conversion table 24. The zenith correction unit 43 reflects the result of the zenith correction in the conversion table 24 to generate the image-combining conversion table 25. Then, the spherical-image generation unit 45 uses the image-combining conversion table 25 that reflects these results of processing to generate an omnidirectional image (spherical image) from two partial-view images.

The camera-shake correction unit 44 corrects the spherical coordinates ($\theta$, $\varphi$) of the image-combining conversion table 25 corrected by the zenith correction unit 43, so as to prevent the camera shake. In other words, the spherical-image generation unit 45 can still generate an omnidirectional image (spherical image) using the image-combining conversion table 25, and the addition of the camera-shake correction unit 44 does not affect the zenith correction unit 43 and the spherical-image generation unit 45.

Figure 14B:
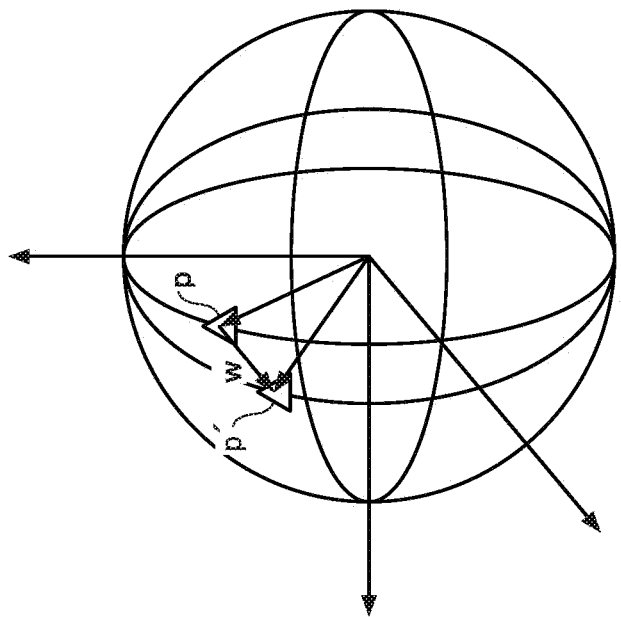
FIG. 14A and FIG. 14B are diagrams used to describe camera-shake correction, according to an embodiment of the present disclosure.
Figure 14A:
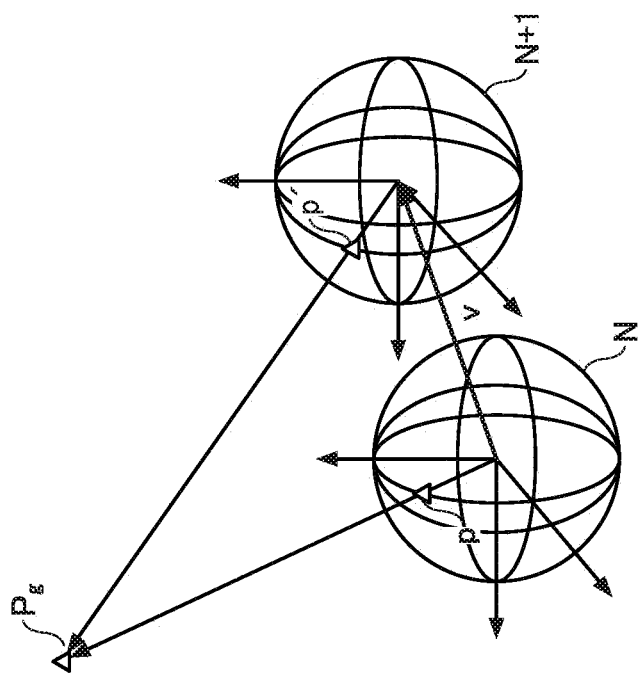

FIG. 14A and FIG. 14B are diagrams used to describe camera-shake correction, according to the present embodiment.

FIG. 14A is a diagram illustrating a frame N and a frame N+1 that are captured at different times in chronological order, according to the present embodiment.

A point Pg is captured in the frame N and the frame N+1 in common, and is captured at different points p and p' in the frame N and the frame N+1. This indicates that the camera shake can be corrected by matching the point p' of the frame N+1 to the point p of the frame N. Note also that each of the frame N and the frame N+1 can be regarded as the omnidirectional image sensing device 100, and a vector v that indicates the movement of the omnidirectional image sensing device 100 indicates differences in position and attitude between the frame N and the frame N+1.

When the omnidirectional image sensing device 100 moves as indicated by the vector v, a certain point on the spherical image appears to have moved by a vector w between the frame N and the frame N+1.

FIG. 14B is a diagram illustrating the vector w, according to the present embodiment.

The vector w is a directed line segment from a point P to a point P', and a longer vector w indicates a greater amount of camera shake. As the correction is performed so as to eliminate the vector w, the vector w is equivalent to the amount of correction to be performed. A method of calculating the vector w is described later with reference to FIG. 17.

Figure 15:
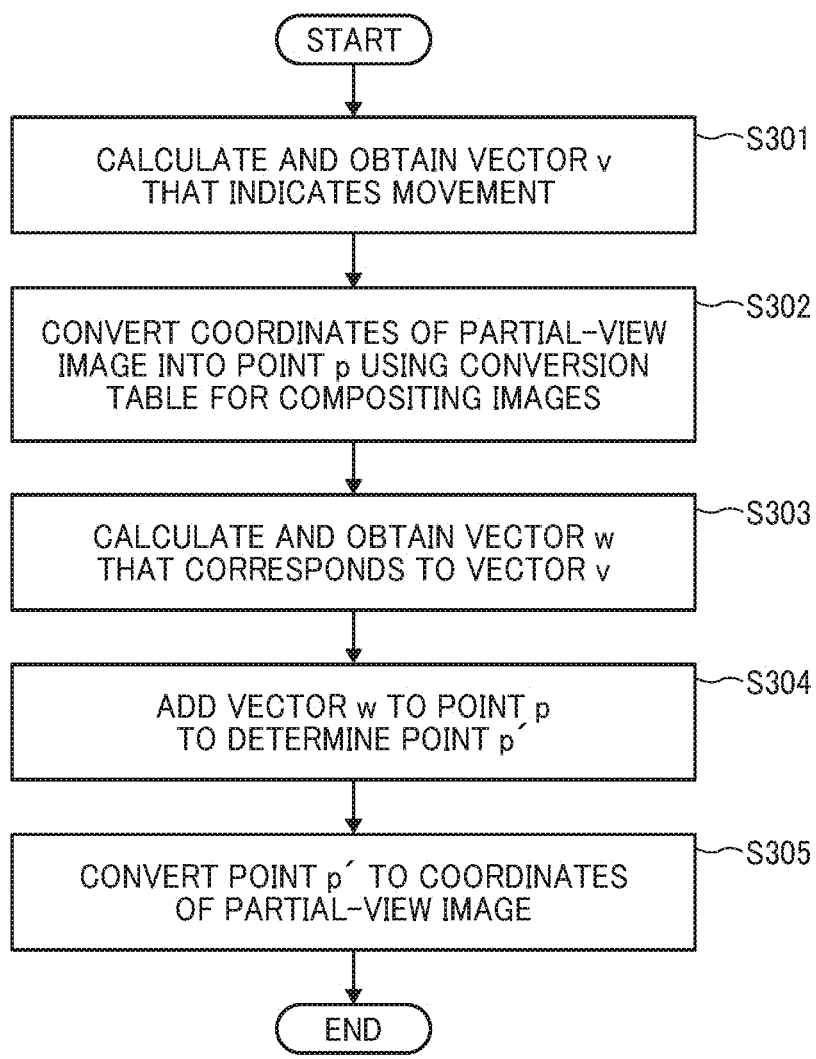
FIG. 15 is a flowchart of the procedure for correcting camera shake performed by a camera-shake correction unit, according to an embodiment of the present disclosure.

FIG. 15 is a flowchart of the processes in which the camera-shake correction unit 44 corrects the camera shake, according to the present embodiment.

The camera-shake correction unit 44 calculates and obtains a vector v that indicates the movement of the omnidirectional image sensing device 100 (step S301). The vector v is measured by the attitude sensor 136 (e.g., an acceleration sensor and a gyroscope sensor). The amount of movement can be obtained by obtaining a definite integral for the acceleration detected by an acceleration sensor two times. In a similar manner, the rotation angle can be obtained by obtaining a definite integral for the angular velocity detected by a gyroscope sensor two times. The range of integration corresponds to the time it takes since the frame N is captured and until the frame N+1 is captured.

Next, the camera-shake correction unit 44 converts the coordinates (x, y) of each of the partial-view image 0 and the partial-view image 1 into a point p on the spherical coordinates, using the image-combining conversion table 25 (step S302). In other words, the coordinates (first planar coordinates) of each of the partial-view image 0 and the partial-view image 1, which are projected onto the solid-state image sensing devices 13A and 13B through fish-eye lenses, are converted into a point p on the spherical coordinates. In this conversion, the image-combining conversion table 25 that is corrected by the zenith correction unit 43 may be used just as it is.

Next, the camera-shake correction unit 44 calculates and obtains a vector w that corresponds to the vector v (step S303). The calculation of the vector is described later in detail with reference to FIG. 17.

Next, the camera-shake correction unit 44 adds the vector w to the point p to determine a point p' (step S304). The point p' exists on the spherical surface.

Next, the camera-shake correction unit 44 converts the point p' to the coordinates (x', y') of each of the partial-view image 0 and the partial-view image 1 (step S305). This conversion is performed as the camera-shake correction unit 44 refers to the image-combining conversion table 25 in an inverted manner. The conversion is described below with reference to FIG. 16. The coordinates (x', y') are an example of the second planar coordinates.

Figures 16, 17:
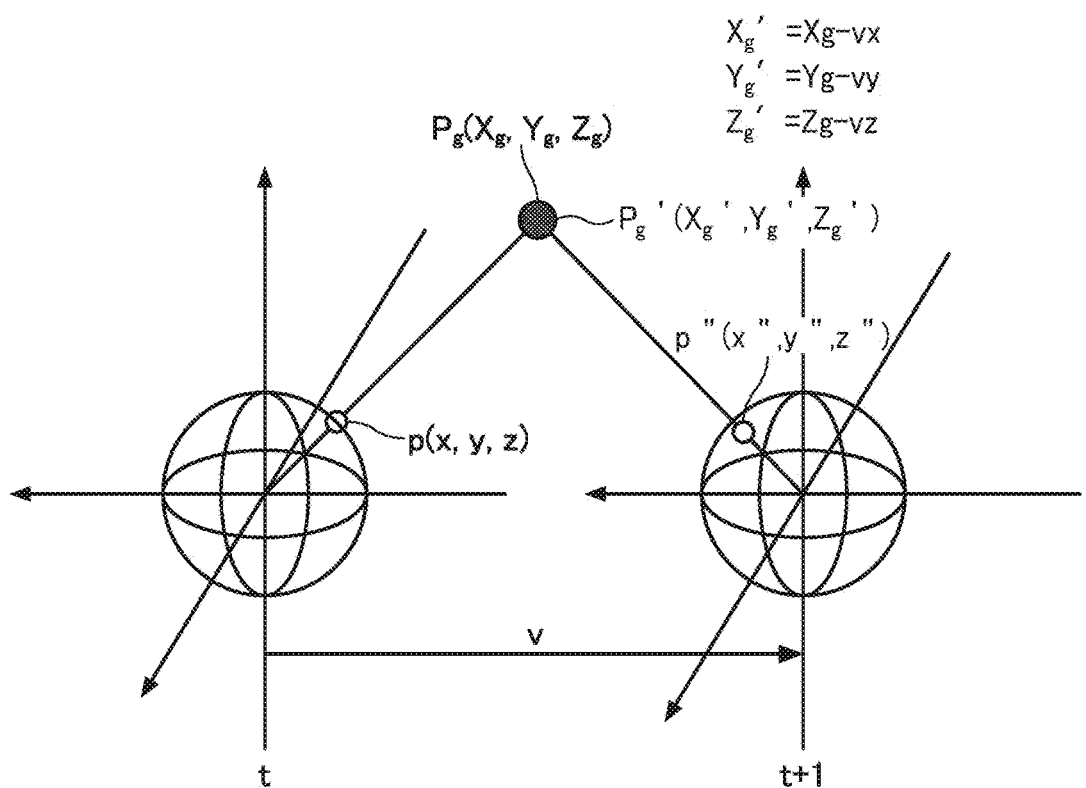
FIG. 16 is a diagram illustrating the processes related to the inverted conversion performed using an image-combining conversion table, according to an embodiment of the present disclosure.
FIG. 17 is a diagram illustrating a method of calculating a vector w, according to an embodiment of the present disclosure.

FIG. 16 is a diagram illustrating the processes related to the inverted conversion performed using the image-combining conversion table 25, according to the present embodiment.

As the point p' is obtained as described above, the corresponding coordinates (xp', yp') can be obtained by performing conversion in an inverted manner. As the coordinates (xp', yp') are associated with the coordinates (θ p, φ p) of the point p, the camera shake can be reduced. Accordingly, the coordinates (xp', yp') in the image-combining conversion table 25 are replaced with the coordinates (xp, yp) of the point p.

The difference between (θp, φp) and (θp', φp') or the difference between the coordinates (xp, yp) and the coordinates (xp', yp') corresponds to the length of the vector w, and these differences can be regarded as the amount of correction.

The image-combining conversion table 25 generated as described above is sent out to the spherical-image generation unit 45, and the spherical-image generation unit 45 generates an omnidirectional image (spherical image) from the partial-view image.

FIG. 17 is a diagram illustrating a method of calculating a vector w, according to the present embodiment. For the sake of explanatory convenience, cases in which there is no rotational component (i.e., when there is no change in posture) are illustrated in FIG. 17. However, even in cases where there are some rotational components, calculation can be made in a similar manner.

Here, it is assumed that the omnidirectional image sensing device 100 has moved as indicated by the vector v. The meaning of each code in FIG. 17 is as follows.

p(x, y, z): The coordinates where a point Pg is captured in a frame N (at time t) in the three-dimensional space p"(x", y", z"): The coordinates where the point Pg is captured in a frame N+1 (at time t+1) in the three-dimensional space Pg(Xg, Yg, Zg): The coordinates of the object in the three-dimensional space (a point in the three-dimensional space before movement)

Vector v: The vector that indicates the movement of the omnidirectional image sensing device 100 vx, vy, vz: The x-component, the y-component, and the z-component of the vector v at the global coordinates Pg'(Xg', Yg', Zg'): The coordinates of the object in the three-dimensional space (a point in the three-dimensional space after movement)

When the omnidirectional image sensing device 100 moves as indicated by the vector v in the global coordinate system, the point p moves by "vx, vy, vz."

Accordingly, given that Pg'(Xg', Yg', Zg') indicates the position of the object in the global coordinate system, each of the components can be expressed as follows.

$$Xg'=Xg-vx$$

$$Yg'=Yg-vy$$

$$Zg'=Zg-vz$$

As known in the art, the conversion from Pg to p is expressed using a perspective projection matrix P as in Formula 3 given below.

$$p=PPg \qquad \text{[Formula 3]}$$

P indicates a matrix indicating the known conversion in perspective projection in the omnidirectional image sensing device 100.

[Formula 4]

$$\begin{pmatrix} x \\ y \\ z \\ w \end{pmatrix} = \begin{pmatrix} m_1 & 0 & 0 & 0 \\ 0 & m_2 & 0 & 0 \\ 0 & 0 & \frac{1}{z_g} & 0 \\ 0 & 0 & 1 & 0 \end{pmatrix} \begin{pmatrix} x_g \\ y_g \\ z_g \\ 1 \end{pmatrix} \qquad (4)$$

A point p" where the object Pg is captured at time t+1 is obtained by multiplying Pg' by the perspective projection matrix P.

$$p''=PPg'  \quad [\text{Formula 5}]$$

Referring to the Formula 3, Pg can be obtained by multiplying p by $P^{-1}$ (inverse matrix). Accordingly, the components xg, yg, and zg of Pg can be obtained from the Formula 3. As vx, vy, and vz are also known, vg', yg', and zg' can also be calculated and obtained. Accordingly, Pg' can be obtained.

Due to the above configuration, p" can be calculated from the Formula 5. The vector w is calculated as the difference between p and p". As described above, the omnidirectional image sensing device 100 according to the present embodiment converts a partial-view image into a three-dimensional sphere in the three-dimensional space, and obtains the amounts of movement by which the point P on the sphere has moved as the vector w, according to the vector v.

However, p" does not necessarily exist on the spherical surface. For this reason, there are some cases where p" cannot be indicated by the spherical coordinates (θ, φ). As the radius r of the omnidirectional image (spherical image) is 1, p"(x", y", z") is corrected to a point on the spherical surface where r=1. x", y", and z" are multiplied by a constant n. n is obtained as follows in view of the characteristic that the radius r=1.

$$n=1\sqrt{\phantom{-}}(x''^2+y''^2+z''^2)$$

As P" is represented in a rectangular coordinate system, the coordinates in the rectangular coordinate system are converted into polar coordinates (r, θ, φ), where r=1. θ and φ are obtained as follows.

$$\theta=\arctan(y''/x'') \quad \varphi=\arccos(z'')$$

As described above, the point p" can be corrected to a point on the spherical surface, and the vector w when the point p moves to the point p' can be calculated and obtained.

Although p" is calculated in the Formula 5, when P or the vector v is accurate, p" becomes equivalent to p', or p" can be considered to be equivalent to p'. In such cases, the point p" can be converted to the coordinates (x', y') of each of the partial-view image 0 and the partial-view image 1 without calculating the vector w (see the S305 in FIG. 15). As described above, it is not always necessary to calculate and obtain the vector w.

As described above with reference to FIG. 1, the impact of camera shake differs depending on the distance to an object. However, there are many cases in which the omnidirectional image sensing device 100 has no distance sensor. In order to handle such a situation, the weighting table 26 may be prepared in advance.

The weighting table 26 is described with reference to FIG. 18A, FIG. 18B, and FIG. 18C.

Figures 18A, 18B:
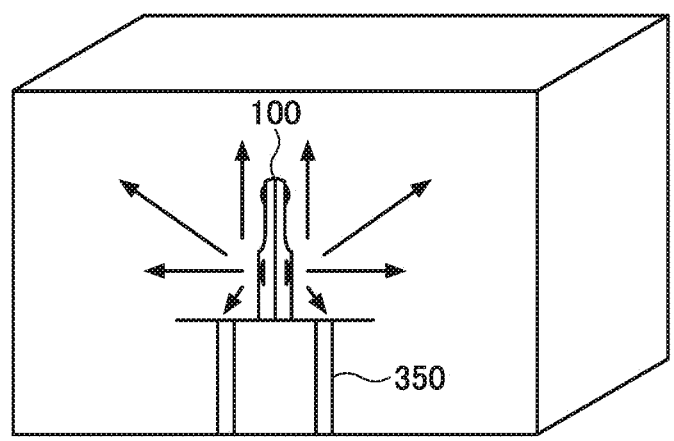
FIG. 18A is a schematic diagram of a capturing scene, according to an embodiment of the present disclosure.
FIG. 18B is a diagram illustrating a weighting table, according to an embodiment of the present disclosure.

FIG. 18A is a schematic diagram illustrating a capturing scene, according to the present embodiment.

In an ordinary room illustrated in FIG. 18A, for example, a desk 350 is placed, and in many cases, it is estimated that the distance between the omnidirectional image sensing device 100 and the desk 350 is the shortest. Moreover, in many cases, it is estimated that the distance between the omnidirectional image sensing device 100 and the wall differs depending on the position at which the omnidirectional image sensing device 100 is disposed is moderate, and that the distance between the omnidirectional image sensing device 100 and the ceiling is the longest. Accordingly, in the latitude (φ) direction, the distance tends to increase as φ increases.

In the present embodiment, φ in the zenith direction and φ in the ground direction are defined as 0 degree and 180 degrees, respectively. As the distance is shorter, the amount of camera-shake correction becomes greater. Accordingly, weighting data that increases as φ is greater may be determined. It is assumed that the weighting data ranges between 0 and 1. In other words, camera shake is not corrected when the weighting data indicates 0, and 50% camera-shake correction is performed when the weighting data indicates 0.5. Moreover, 100% camera-shake correction is performed when the weighting data indicates 1.

FIG. 18B is a diagram illustrating a weighting table 26 according to the present embodiment.

Figure 18C:
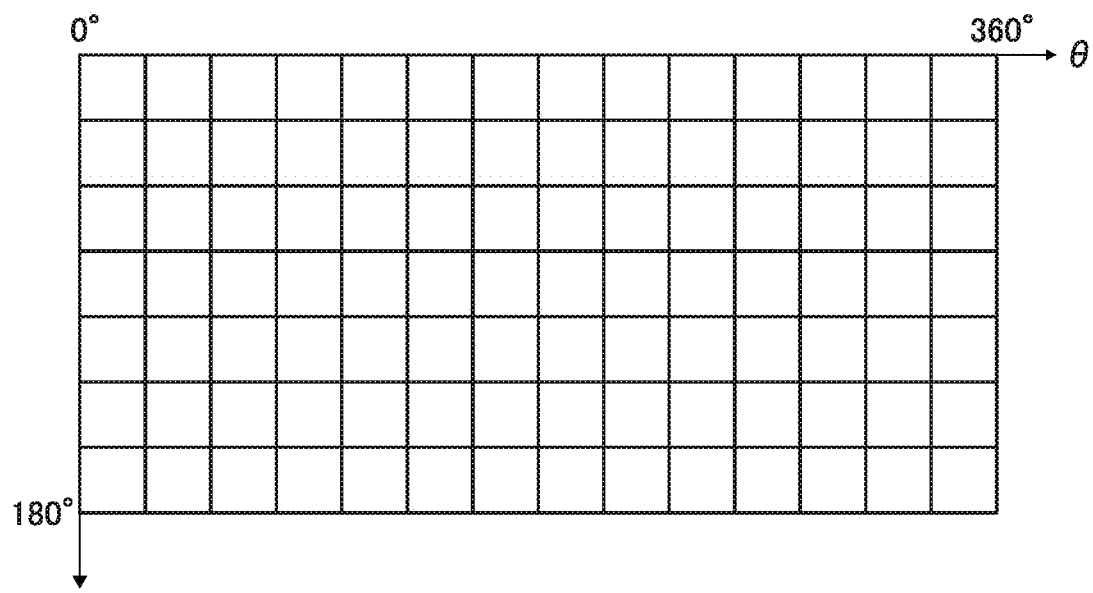
FIG. 18C is a diagram illustrating how θ and φ are marked on a weighting table, according to an embodiment of the present disclosure.

FIG. 18C is a diagram illustrating how θ and φ are marked on the weighting table 26, according to the present embodiment. In FIG. 18C, "φ=0" indicates the zenith direction, and "φ=180" indicates the ground direction. Accordingly, the value of the weighting data increases as φ is greater.

When the camera-shake correction unit 44 calculates and obtains the vector w, the camera-shake correction unit 44 multiplies vx, vy, and vz by the value ranging between 0 to 1. As the value of φ is greater, the vector w increases. In other words, as the value of φ is smaller, the vector w decreases. Accordingly, when φ of the object is greater, camera-shake correction can be performed to a larger degree.

A user may select weighting data from the weighting table 26 according to the capturing scene. The distance between the omnidirectional image sensing device 100 and the object has some similarity according to the capturing scene. For example, in indoor situations, there is a tendency as described above with reference to FIG. 18A. By contrast, there is no wall in outdoor situations and the distance in the ground direction tends to be longer than that of the indoor situations. Moreover, in narrow space like in-car situations, the distance between the omnidirectional image sensing device 100 and the object is short in any of the up-and-down and right-and-left directions.

Figure 19:
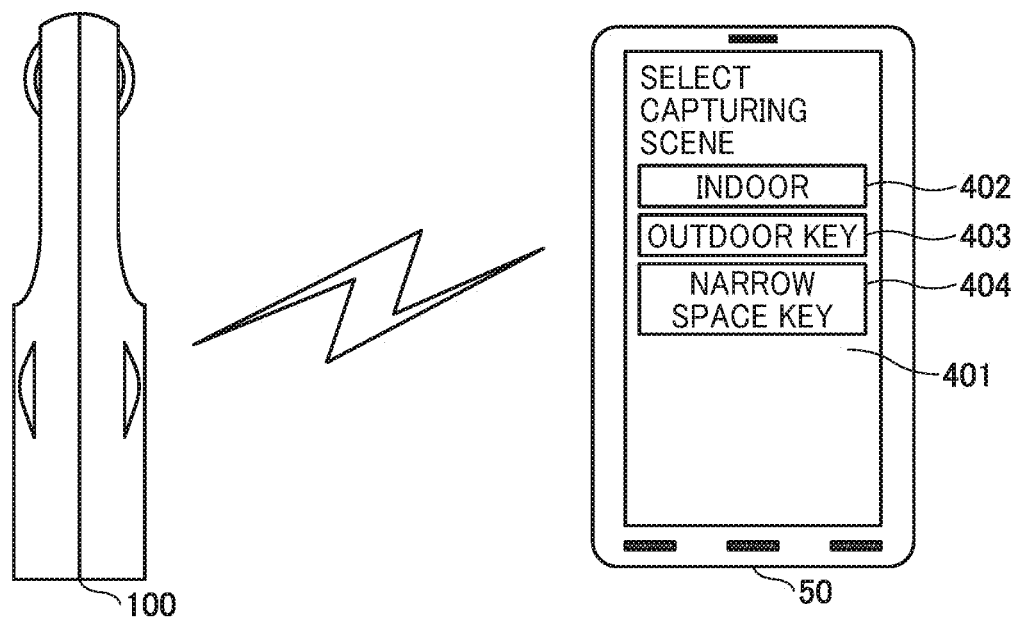
FIG. 19 is a diagram illustrating a selection screen for a weighting table, according to an embodiment of the present disclosure.

FIG. 19 is a diagram illustrating a selection screen 401 for the weighting table 26, according to the present embodiment.

The omnidirectional image sensing device 100 communicates with the terminal device 50 through a wireless connection. In the terminal device 50, application software of the omnidirectional image sensing device 100 is operating, and the selection screen 401 for the weighting table 26 is displayed on a display of the terminal device 50. On the selection screen 401 of the weighting table 26, an indoor key 402, an outdoor key 403, and a narrow space key 404 are displayed, and the user selects and presses one of these keys in view of the capturing scene. The terminal device 50 accepts the user's operation, and sends selected capturing scene to the omnidirectional image sensing device 100. Due to this configuration, the omnidirectional image sensing device 100 can perform camera-shake correction upon selecting weighting data suitable for capturing scene from the weighting table 26.

Figure 20:
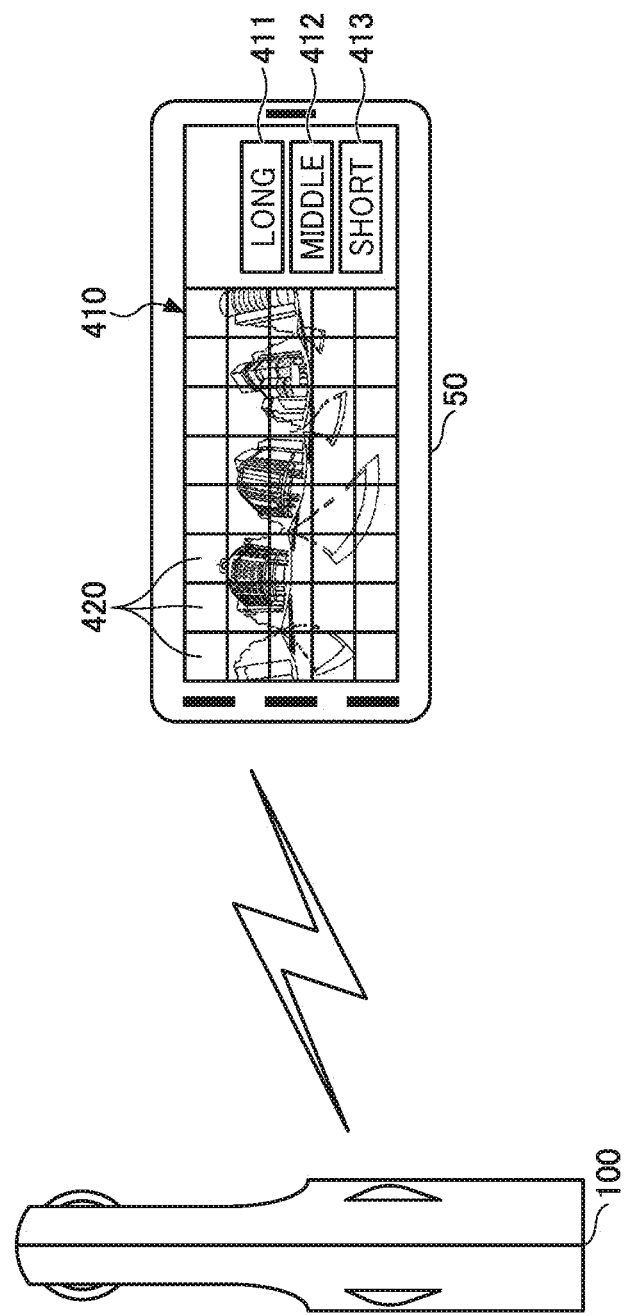
FIG. 20 is a diagram illustrating an input screen of the weighting data, according to an embodiment of the present disclosure.

As illustrated in FIG. 20, a user may input weighting data to the weighting table 26.

FIG. 20 is a diagram illustrating an input screen 410 of the weighting data, according to the present embodiment.

As illustrated in FIG. 20, the terminal device 50 displays a captured omnidirectional image (spherical image) (equidistant cylindrical projection in FIG. 20) on a temporary basis. The terminal device 50 displays the omnidirectional image (spherical image) upon dividing it into a plurality of mesh-like sections 420 by, for example, dotted lines. The user determines the distance to the omnidirectional image sensing device 100 for each one of the mesh-like sections 420, and touches one of a long key 411, a middle key 412, and a short key 413 as distance data and then touches one of the mesh-like sections 420. Due to this configuration, the spherical coordinates (θ, φ) of the omnidirectional image (spherical image) can be associated with one of the long distance, the middle distance, and the short distance.

The terminal device 50 sends the association between the spherical coordinates (θ, φ) and the long distance, the middle distance, and the short distance to the omnidirectional image sensing device 100. The omnidirectional image sensing device 100 associates the long distance, the middle distance, and the short distance with 0, 0.5, and 1, respectively, and generates the weighting table 26.

Note that the user is not required to associate each one of the mesh-like sections 420 with one of the long distance, the middle distance, and the short distance. The omnidirectional image sensing device 100 interpolates the mesh-like sections that are not associated with any one of the long distance, the middle distance, and the short distance. Accordingly, the weighting data is calculated and obtained.

As illustrated in FIG. 20, if a user inputs weighting data to the weighting table 26, the weighting table 26 that is more suitable for the capturing scene can be obtained. Accordingly, it becomes easier to improve the image quality due to the camera-shake correction.

The omnidirectional image sensing device 100 may measure the distance the object and generate the weighting table 26 according to the measured distance. For example, the omnidirectional image sensing device 100 may be provided with a laser range finder (LRF). Alternatively, the omnidirectional image sensing device 100 may be provided with a sensor that measures the distance to the object such as a stereo camera. The omnidirectional image sensing device 100 generates the weighting table 26 based on the measured distance. More specifically, the distance to an object that is at a distance longer than a predetermined distance is set to be the longest distance, and the weighting data of the longest distance is set to be 0 and the weighting data of the shortest distance is set to be 1. Then, the weighting data of an object at a distance between the longest distance and the shortest distance is determined according to the distance.

When the weighting data is determined according to the measured distance, the weighting table 26 can be obtained more accurately. Accordingly, it becomes easier to improve the image quality due to the camera-shake correction.

Next, some effects of the camera-shake correction are described with reference to FIG. 22A and FIG. 22B.

Figure 21:
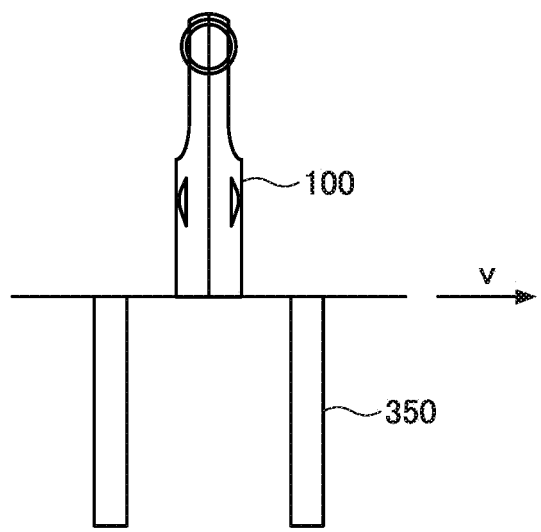
FIG. 21 is a diagram illustrating an experiment of camera-shake correction, according to an embodiment of the present disclosure.

FIG. 21 is a diagram illustrating an experiment of camera-shake correction, according to the present embodiment.

In FIG. 21, the omnidirectional image sensing device 100 is fixed onto a desk 350. While the omnidirectional image sensing device 100 is capturing moving images, the experimenter moves the desk 350 parallel to the floor. In the capturing area of the omnidirectional image sensing device 100, no moving object exists. Accordingly, the camera shake that is caused to the omnidirectional image sensing device 100 due to the movement in a parallel manner can be reproduced.

Figure 22A:
FIG. 22A and FIG. 22B are diagrams used to describe some effects of camera-shake correction according to an embodiment of the present disclosure.
Figure 22B:
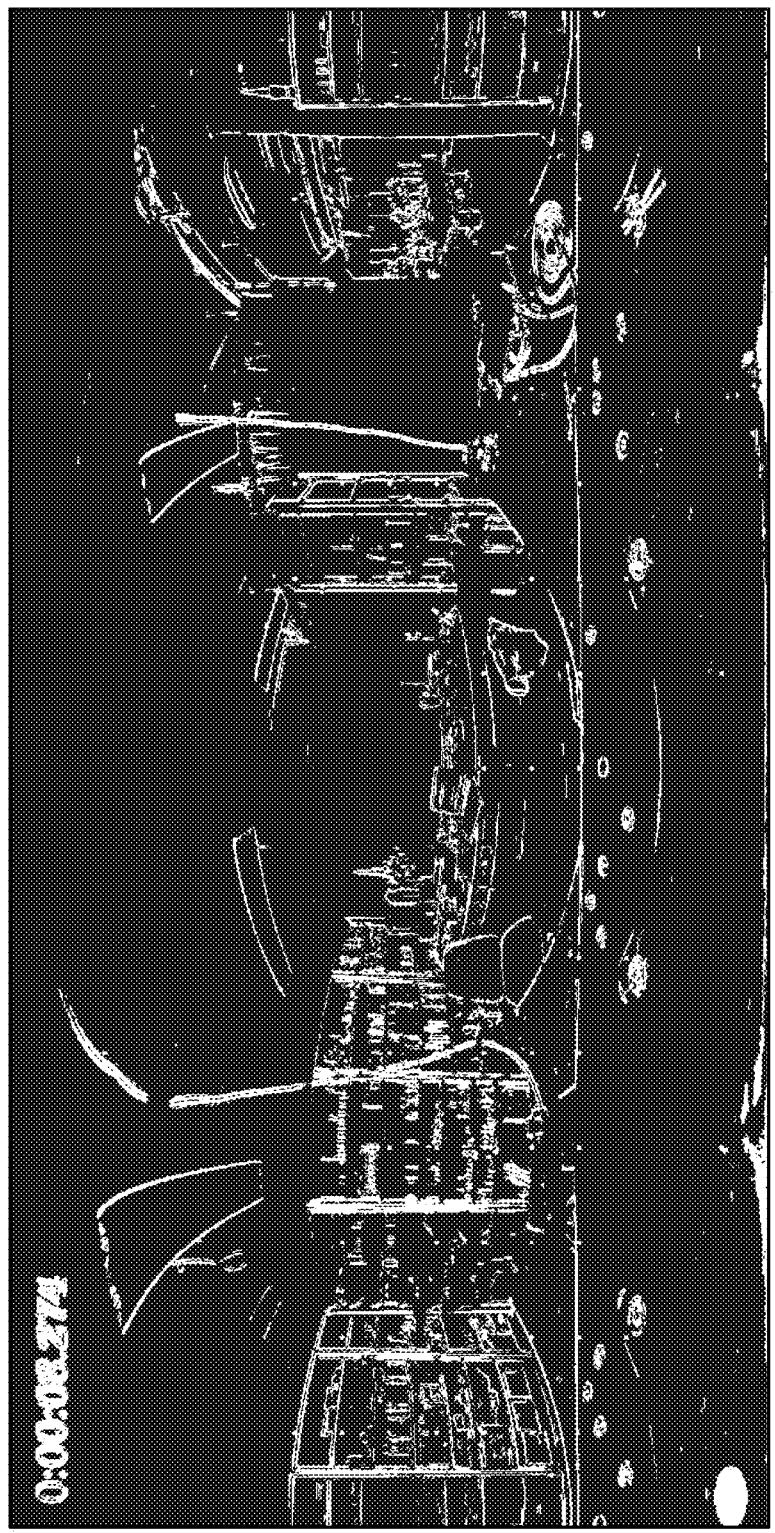

FIG. 22A and FIG. 22B are diagrams used to describe some effects of the camera-shake correction according to the present embodiment.

Firstly, the experimenter prepares an omnidirectional image (spherical image) 1 to which camera shake has been occurred at certain time. Secondly, the experimenter performs the camera-shake correction as described above according to the present embodiment on this omnidirectional image (spherical image) to generate an omnidirectional image (spherical image) 2.

FIG. 22A is an omnidirectional image (spherical image) of the capturing environment, which is given for reference purposes.

FIG. 22B is a diagram illustrating a subtraction image between the omnidirectional image (spherical image) 1 and the omnidirectional image 2.

The pixels where there is no significant difference appears black, and the pixels where there is some difference appears white.

In the capturing area of the omnidirectional image sensing device 100, no moving object exists. For this reason, if any difference is caused to the image, that indicates the changes caused to the image by the camera-shake correction. As illustrated in FIG. 22A and FIG. 22B, some differences are obtained due to the camera-shake correction, and this indicates that the camera-shake correction according to the present embodiment is effective.

As described above, the omnidirectional image sensing device 100 according to the present embodiment obtains the movement of the omnidirectional image sensing device 100 in the three-dimensional space using, for example, the attitude sensor 136, and estimates the amount of camera-shake correction due to the obtained movement in a three-dimensional state (on spherical coordinates). Due to this configuration, camera shake can be prevented also on a wide-angle image where it is difficult to perform camera-shake correction in a similar manner to the camera-shake correction to be performed on a planar image. Accordingly, it is not necessary to adopt an optical camera-shake correction mechanism and an electronic camera-shake correction mechanism.

Numerous additional modifications and variations are possible in light of the above teachings. It is therefore to be understood that within the scope of the appended claims, the disclosure of the present invention may be practiced otherwise than as specifically described herein. For example, elements and/or features of different illustrative embodiments may be combined with each other and/or substituted for each other within the scope of this disclosure and appended claims.

For example, it is described in the present embodiment that the image processing block 116 is implemented by hardware circuitry. However, the functions of the image processing block 116 may be implemented by software. For example, the terminal device 50 may have the functions of the image processing block 116 of the omnidirectional image sensing device 100. Alternatively, assuming that the omnidirectional image sensing device 100 is a client and the terminal device 50 is a server, the server may perform camera-shake correction.

The terminal device 50 may be used as the omnidirectional image sensing device 100. In such cases, two fish-eye lenses are externally coupled to the terminal device 50. Due to this configuration, the terminal device 50 can perform the camera-shake correction according to the present embodiment. Accordingly, the omnidirectional image sensing device 100 may be an information processing device.

In the configuration as described above with reference to FIG. 6B, camera-shake correction is performed after the zenith is corrected. However, camera-shake correction may be performed before the zenith is corrected. In such a configuration, the zenith is not corrected, and thus it is difficult to take into consideration the distance data. Accordingly, the weighting table 26 is generated assuming that an object to be captured is determined in advance. For example, in a configuration where the omnidirectional image sensing device 100 that is fixed to a stage captures an image while being moved together with the stage, the weighting table 26 can be prepared in advance.

In the present embodiment, the attitude is detected using a gyroscope sensor. However, the orientation of the omnidirectional image sensing device 100, where it is assumed that the vertical direction is the axis, may be detected using a geomagnetic sensor.

In the example configuration as described above with reference to, for example, FIG. 6A and FIG. 6B, the processing is divided into some major functions to facilitate the understanding of the processing of the omnidirectional image sensing device 100. The embodiments of the present disclosure are not limited by how the processing is divided into processing units or by the names of the units. The processing of the omnidirectional image sensing device 100 may be divided into a larger number of processing units depending on the detail of the processing of the omnidirectional image sensing device 100. Such division of the processing of the omnidirectional image sensing device 100 may be made such that one processing unit includes a larger number of processes.

Note also that the captured-image acquisition unit 41 is an example of a captured-image acquisition unit, and the attitude sensor 136 is an example of a movement detection unit. Moreover, the camera-shake correction unit 44 is an example of a correction unit, and the image-combining conversion table 25 is an example of association data. Further, Pg is an example of point on the first sphere, and Pg' is an example of point on the second sphere.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

What is claimed is:

1. An image processing apparatus, comprising:
   circuitry configured to
   obtain a captured image captured using a wide-angle lens,
   detect translational movement of the image processing apparatus by determining a first three-dimensional vector, which represents displacement of the image processing apparatus from a first time to a second time,
   convert the captured image into a wide-angle image that is at least partially defined on a curved plane, and
   calculate an amount of correction based on the wide-angle image and the detected translational movement by calculating a second three-dimensional vector based on the determined first three-dimensional vector, and correct the captured image using the calculated second three-dimensional vector.

2. The image processing apparatus according to claim 1, wherein the circuitry is further configured to convert the captured image into a sphere, and calculate an amount of movement of a point on the sphere by calculating the second three-dimensional vector, according to the determined first three-dimensional vector, and correct the captured image by the calculated amount of correction, which is based on the calculated second three-dimensional vector.

3. The image processing apparatus according to claim 2, wherein the circuitry is further configured to
   refer to association data in which planar coordinates of the captured image and spherical coordinates of the sphere are associated with each other, and convert first planar coordinates of the captured image into corresponding coordinates on the sphere,
   change the coordinates of the sphere according to the detected translational movement, and
   replace second planar coordinates that are associated with the changed coordinates of the sphere in the association data with the first planar coordinates.

4. The image processing apparatus according to claim 3, wherein the circuitry is further configured to
   perform inverse conversion of a conversion in perspective projection, in which a point in three-dimensional space is projected onto the point on the sphere, on a first point of a first sphere, to convert a point in three-dimensional space before the translational movement into a point in three-dimensional space after the translational movement according to x, y, z components of the detected translational movement,
   perform the conversion in perspective projection for the point in three-dimensional space after the translational movement to calculate a second point on a second sphere, and
   regard the second point on the second sphere as the coordinates of the sphere.

5. The image processing apparatus according to claim 4, wherein the circuitry is further configured to calculate a difference between the first point of the first sphere and the second point of the second sphere, and add the difference to the first point of the first sphere to obtain a point on a spherical surface of the sphere.

6. The image processing apparatus according to claim 4, wherein the circuitry is further configured to
   calculate a difference between the first point of the first sphere and the second point of the second sphere,
   add the difference to the first point of the first sphere to obtain a point as the changed coordinates of the sphere, and
   replace the second planar coordinates associated with the changed coordinates of the sphere in the association data with the first planar coordinates.

7. The image processing apparatus according to claim 3, wherein the circuitry is further configured to
   refer to weighting data in which a weighting indicating a degree of correction is associated with the spherical coordinates, and
   change coordinates of the sphere by the weighting associated with the spherical coordinates, according to the detected translational movement.

8. The image processing apparatus according to claim 7, wherein the circuitry is further configured to determine the weighting data using a distance to an object estimated according to the spherical coordinates, and
   wherein the spherical coordinates are associated with the weighting being greater when the distance is shorter and smaller when the distance is longer.

9. The image processing apparatus according to claim 7, wherein the weighting data is specified in advance according to a capturing scene, and
   wherein the circuitry is further configured to correct the captured image using the weighting data, which is selected by a user.

10. The image processing apparatus according to claim 7, wherein when an image captured by the image processing apparatus is displayed upon being divided into a plurality of mesh-like sections, the circuitry is further configured to generate weighting data according to distance data input by a user for each one of the mesh-like sections.

11. A method of processing an image, the method comprising:
- obtaining a captured image captured using a wide-angle lens;
- detecting translational movement of an image processing apparatus by determining a first three-dimensional vector, which represents displacement of the image processing apparatus from a first time to a second time;
- converting the captured image into a wide-angle image that is at least partially defined on a curved plane;
- calculating an amount of correction based on the wide-angle image and the translational movement detected in the detecting step by calculating a second three-dimensional vector based on the determined first three-dimensional vector; and
- correcting the captured image using the calculated second three-dimensional vector.

12. A non-transitory computer-readable recording medium storing a program that causes a computer to execute a method comprising:
- obtaining a captured image captured using a wide-angle lens;
- detecting translational movement of an image processing apparatus by determining a first three-dimensional vector, which represents displacement of the image processing apparatus from a first time to a second time;
- converting the captured image into a wide-angle image that is at least partially defined on a curved plane;
- calculating an amount of correction based on the wide-angle image and the translational movement detected in the detecting step by calculating a second three-dimensional vector based on the determined first three-dimensional vector; and
- correcting the captured image using the calculated second three-dimensional vector.

* * * * *